(12) United States Patent
Yamashita

(10) Patent No.: US 12,038,063 B2
(45) Date of Patent: Jul. 16, 2024

(54) SHOCK ABSORBER

(71) Applicant: Hitachi Astemo, Ltd., Ibaraki (JP)

(72) Inventor: Mikio Yamashita, Ibaraki (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 466 days.

(21) Appl. No.: 17/417,400

(22) PCT Filed: Nov. 12, 2019

(86) PCT No.: PCT/JP2019/044319
§ 371 (c)(1),
(2) Date: Jun. 23, 2021

(87) PCT Pub. No.: WO2020/137207
PCT Pub. Date: Jul. 2, 2020

(65) Prior Publication Data
US 2022/0074461 A1    Mar. 10, 2022

(30) Foreign Application Priority Data

Dec. 25, 2018   (JP) ................................. 2018-241206

(51) Int. Cl.
*F16F 9/512*    (2006.01)
*F16F 9/06*    (2006.01)
(Continued)

(52) U.S. Cl.
CPC .............. *F16F 9/512* (2013.01); *F16F 9/062* (2013.01); *F16F 9/348* (2013.01)

(58) Field of Classification Search
CPC .... F16F 9/512; F16F 9/185; F16F 9/34; F16F 9/062; F16F 9/348; F16F 9/504; F16F 9/5126; F16F 9/3485
(Continued)

(56) References Cited

U.S. PATENT DOCUMENTS

| 4,953,671 A | * | 9/1990 | Imaizumi | F16F 9/512 |
| | | | | 188/282.3 |
| 5,129,488 A | * | 7/1992 | Furuya | F16F 9/5126 |
| | | | | 188/317 |

(Continued)

FOREIGN PATENT DOCUMENTS

| DE | 10 2009 047 261 B3 | 2/2011 |
| DE | 10 2012 011 622 A1 | 12/2012 |

(Continued)

OTHER PUBLICATIONS

Indian Office Action received in corresponding Indian Application No. 202117027827 dated Feb. 25, 2022.

(Continued)

*Primary Examiner* — Robert A. Siconolfi
*Assistant Examiner* — James K Hsiao
(74) *Attorney, Agent, or Firm* — MATTINGLY & MALUR, PC

(57) ABSTRACT

A valve seat member is provided in a cap member. A first sub valve is provided in another side chamber. A second sub valve is provided in a cap chamber formed between a bottom portion of the cap member and the valve seat member. In a second passage, an orifice is disposed on an upstream side or a downstream side from the first sub valve in flow by which the first sub valve is opened. In a region in which a piston speed is low, a valve of a second damping force generating mechanism is opened in a state in which a valve of a first damping force generating mechanism is closed. In a speed region in which the piston speed is higher than in another region, the valve of the first damping force generating mechanism and the valve of the second damping force generating mechanism are both opened.

7 Claims, 14 Drawing Sheets

(51) Int. Cl.
*F16F 9/34* (2006.01)
*F16F 9/348* (2006.01)

(58) Field of Classification Search
USPC .......................................................... 267/136
See application file for complete search history.

(56) References Cited

U.S. PATENT DOCUMENTS

| | | | | |
|---|---|---|---|---|
| 5,386,892 | A * | 2/1995 | Ashiba | F16F 9/512 |
| | | | | 188/322.22 |
| 6,918,473 | B2 * | 7/2005 | Deferme | F16F 9/5126 |
| | | | | 188/282.1 |
| 8,844,687 | B2 * | 9/2014 | Yu | F16F 9/5126 |
| | | | | 188/280 |
| 8,978,845 | B2 * | 3/2015 | Kim | F16F 9/5126 |
| | | | | 188/313 |
| 9,080,634 | B2 * | 7/2015 | Nowaczyk | F16F 9/182 |
| 9,194,457 | B2 * | 11/2015 | Kim | F16F 9/5126 |
| 9,239,092 | B2 * | 1/2016 | Nowaczyk | F16F 9/5126 |
| 9,249,854 | B2 * | 2/2016 | Kim | F16F 9/348 |
| 10,330,169 | B2 * | 6/2019 | Kim | F16F 9/3485 |
| 10,619,694 | B2 * | 4/2020 | Yamashita | F16F 9/19 |
| 10,995,813 | B2 * | 5/2021 | Yamashita | F16J 15/16 |
| 2005/0045440 | A1 * | 3/2005 | Kock | F16F 9/512 |
| | | | | 188/322.15 |
| 2012/0305352 | A1 * | 12/2012 | Yu | F16F 9/5126 |
| | | | | 188/322.15 |
| 2012/0312648 | A1 * | 12/2012 | Yu | F16F 9/5126 |
| | | | | 188/280 |
| 2013/0333993 | A1 * | 12/2013 | Yu | F16F 9/3214 |
| | | | | 188/322.22 |
| 2014/0048366 | A1 * | 2/2014 | Lee | F16F 9/5126 |
| | | | | 188/322.15 |
| 2014/0353099 | A1 | 12/2014 | Yamashita et al. | |
| 2015/0027829 | A1 * | 1/2015 | Nowaczyk | F16F 9/3214 |
| | | | | 188/313 |
| 2015/0041269 | A1 * | 2/2015 | Lim | F16F 9/3485 |
| | | | | 188/322.15 |
| 2015/0152936 | A1 * | 6/2015 | Kim | F16F 9/5126 |
| | | | | 188/313 |
| 2015/0247546 | A1 * | 9/2015 | Nowaczyk | F16F 9/512 |
| | | | | 188/313 |
| 2016/0201752 | A1 | 7/2016 | Kim et al. | |
| 2018/0216690 | A1 * | 8/2018 | Yamashita | F16F 9/348 |
| 2019/0107170 | A1 * | 4/2019 | Inamitsu | F16F 9/512 |
| 2019/0120319 | A1 * | 4/2019 | Inamitsu | F16F 9/512 |
| 2022/0074461 | A1 | 3/2022 | Mikio | |

FOREIGN PATENT DOCUMENTS

| | | |
|---|---|---|
| DE | 10 2016 000 098 A1 | 7/2016 |
| JP | 2-41666 B2 | 9/1990 |
| JP | 5078574 B2 | 11/2012 |
| JP | 5536600 B2 | 7/2014 |
| JP | 2018-105378 A | 7/2018 |
| JP | 7111836 B2 | 8/2022 |
| WO | 2018/062151 | 4/2018 |

OTHER PUBLICATIONS

International Search Report received in corresponding International Application No. PCT/JP2019/044319 mailed Jan. 7, 2020.
Written Opinion received in corresponding International Application No. PCT/JP2019/044319 mailed Jan. 7, 2020.
German Office Action received in corresponding German Application No. 11 2019 006 507.6 dated May 11, 2023.
Japanese Office Action received in corresponding Japanese Application No. 2022-116460 dated Jan. 23, 2024.

* cited by examiner

SHOCK ABSORBER

TECHNICAL FIELD

The present invention relates to a shock absorber.

Priority is claimed on Japanese Patent Application No. 2018-241206, filed Dec. 25, 2018, the content of which is incorporated herein by reference.

BACKGROUND ART

In some shock absorbers, two valves which are opened in the same stroke are disposed in parallel (see, for example, Patent Document 1).

CITATION LIST

Patent Document

[Patent Document 1]
Japanese Examined Patent Application, Second Publication No. H2-41666

SUMMARY OF INVENTION

Technical Problem

By disposing the valves which are opened in the same stroke in parallel, it is possible to open only one valve in a region in which a piston speed is low and to open both valves in a region in which the piston speed is higher than that in the region in which the piston speed is low. In such a structure, it is required to improve the durability of the valve on the low speed side in particular.

The present invention provides a shock absorber that can improve the durability of the valve.

Solution to Problem

According to a first aspect of the present invention, there is provided a shock absorber including a piston which is slidably provided in a cylinder and divides an inside of the cylinder into one side chamber and another side chamber; a first passage and a second passage through which the working fluid flows from a chamber on an upstream side to a chamber on a downstream side in the cylinder by a movement of the piston; a first damping force generating mechanism which is provided in the first passage provided in the piston and generates a damping force; and a second damping force generating mechanism which is provided in an annular valve seat member disposed in the other side chamber, is provided in the second passage which is parallel to the first passage, and generates a damping force. The second damping force generating mechanism includes a first sub valve provided on one side of the second passage provided in the valve seat member and a second sub valve provided on another side of the second passage, and a bottomed tubular cap member provided between the piston and the valve seat member in the second passage. The valve seat member is provided in the cap member. The first sub valve is provided in the other side chamber. The second sub valve is provided in a cap chamber between a bottom portion of the cap member and the valve seat member. In the second passage, an orifice is disposed on an upstream side or a downstream side from the first sub valve in flow by which the first sub valve is opened. In a region in which a piston speed is low, a valve of the second damping force generating mechanism is opened in a state in which a valve of the first damping force generating mechanism is closed. In a speed region in which the piston speed is higher than that in the region in which the piston speed is low, the valve of the first damping force generating mechanism and the valve of the second damping force generating mechanism are both opened.

Advantageous Effects of Invention

According to the above-mentioned shock absorber, it is possible to improve the durability of the valve.

DESCRIPTION OF EMBODIMENTS

First Embodiment

Figure 1:
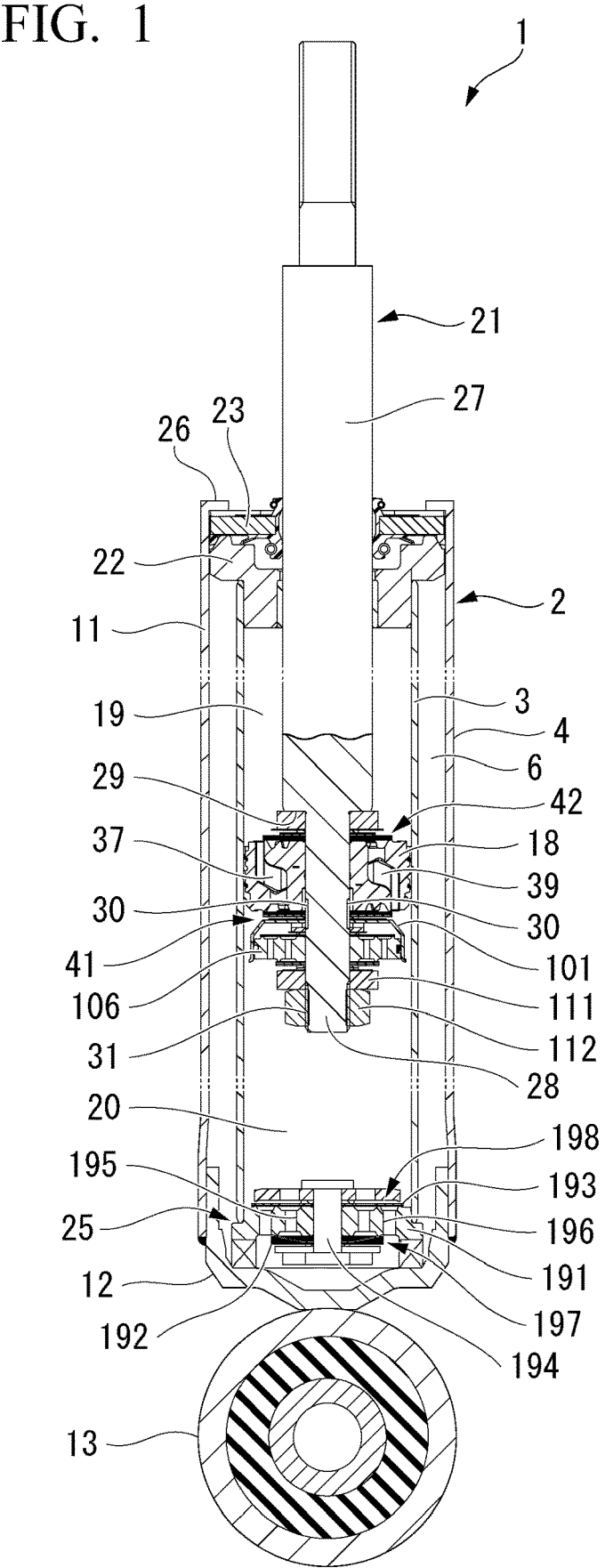
FIG. 1 is a cross-sectional view showing a shock absorber according to a first embodiment of the present invention.

A first embodiment according to the present invention will be described with reference to FIGS. 1 to 5. In the following description, for convenience of explanation, the upper side in the drawing will be referred to as "upper" and the lower side in the drawing will be referred to as "lower."

As shown in FIG. 1, a shock absorber 1 of the first embodiment is a so-called double-cylinder type hydraulic shock absorber. The shock absorber 1 includes a cylinder 2 which is filled with an oil liquid (not shown) as a working fluid. The cylinder 2 has a cylindrical inner cylinder 3 and a bottomed cylindrical outer cylinder 4 having a diameter larger than that of the inner cylinder 3 and concentrically provided to cover the inner cylinder 3. A reservoir chamber 6 is formed between the inner cylinder 3 and the outer cylinder 4.

The outer cylinder 4 includes a cylindrical body member 11 and a bottom member 12 which is fitted and fixed to the lower side of the body member 11 to close the lower portion of the body member 11. An attachment eye 13 is fixed to the bottom member 12 at an outer position opposite to the body member 11.

The shock absorber 1 includes a piston 18 slidably provided inside the inner cylinder 3 of the cylinder 2. The piston 18 defines two chambers, that is, an upper chamber 19 (i.e., one side chamber) which is one cylinder inner chamber and a lower chamber 20 (i.e., another side chamber) which is another cylinder inner chamber, in the inner cylinder 3. In other words, the piston 18 is slidably provided in the cylinder 2 and divides the inside of the cylinder 2 into the upper chamber 19 on one side and the lower chamber 20 on another side. The upper chamber 19 and the lower chamber 20 in the inner cylinder 3 are filled with an oil liquid as a working fluid. The reservoir chamber 6 between the inner cylinder 3 and the outer cylinder 4 is filled with an oil liquid and a gas as working fluids.

The shock absorber 1 includes a piston rod 21 of which one end side portion in an axial direction is disposed inside the inner cylinder 3 of the cylinder 2 to be connected and fixed to the piston 18 and of which another end side portion extends outside the cylinder 2. The piston rod 21 passes through the upper chamber 19 and does not pass through the lower chamber 20. Therefore, the upper chamber 19 is a rod side chamber through which the piston rod 21 passes, and the lower chamber 20 is a bottom side chamber on the bottom side of the cylinder 2.

The piston 18 and the piston rod 21 move integrally. In an extension stroke of the shock absorber 1 in which the amount of protrusion of the piston rod 21 from the cylinder 2 is increased, the piston 18 moves toward the upper chamber 19. In a contraction stroke of the shock absorber 1 in which the amount of protrusion of the piston rod 21 from the cylinder 2 is decreased, the piston 18 moves toward the lower chamber 20.

A rod guide 22 is fitted to an upper end opening side of the inner cylinder 3 and the outer cylinder 4. A seal member 23 is fitted to the outer cylinder 4 on the upper side which is the outer side of the cylinder 2 with respect to the rod guide 22. Both the rod guide 22 and the seal member 23 have an annular shape. The piston rod 21 is slidably inserted inside each of the rod guide 22 and the seal member 23 and extends from the inside of the cylinder 2 to the outside of the cylinder 2. In the piston rod 21, the one end side portion in the axial direction is fixed to the piston 18 inside the cylinder 2, and the other end side portion in the axial direction protrudes outside the cylinder 2 via the rod guide 22 and the seal member 23.

The rod guide 22 supports the piston rod 21 to be movable in the axial direction while restricting a movement of the piston rod 21 in a radial direction and guides the movement of the piston rod 21. The seal member 23 is in close contact with the outer cylinder 4 at the outer peripheral portion of the seal member 23 and is in sliding contact with the outer peripheral portion of the piston rod 21 moving in the axial direction at the inner peripheral portion of the seal member 23. As a result, the seal member 23 prevents the oil liquid in the inner cylinder 3 and the high-pressure gas and the oil liquid in the reservoir chamber 6 in the outer cylinder 4 from leaking to the outside.

The outer peripheral portion of the rod guide 22 has a stepped shape in which the upper portion has a diameter larger than that of the lower portion. In the rod guide 22, the lower portion having the small diameter is fitted to the inner peripheral portion of the upper end of the inner cylinder 3, and the upper portion having the large diameter is fitted to the inner peripheral portion of the upper portion of the outer cylinder 4. A base valve 25 that defines the lower chamber 20 and the reservoir chamber 6 is installed on the bottom member 12 of the outer cylinder 4. The inner peripheral portion of the lower end of the inner cylinder 3 is fitted to the base valve 25. The upper end portion of the outer cylinder 4 is swaged inward in the radial direction to form a locking portion 26. The locking portion 26 and the rod guide 22 sandwich the seal member 23.

The piston rod 21 has a main shaft portion 27 and an attachment shaft portion 28 having a diameter smaller than that of the main shaft portion 27. In the piston rod 21, the main shaft portion 27 is slidably fitted to the rod guide 22 and the seal member 23, and the attachment shaft portion 28 is disposed in the cylinder 2 and is connected to the piston 18 and the like. The end portion of the main shaft portion 27 on the attachment shaft portion 28 side is a shaft step portion 29 extending in a direction orthogonal to an axis. In the outer peripheral portion of the attachment shaft portion 28, at an intermediate position thereof in the axial direction, a pair of passage cutout portions 30 extending in the axial direction is formed, and at a tip end position on a side opposite to the main shaft portion 27 in the axial direction, a male screw 31 is formed. The passage cutout portion 30 has a so-called two-sided width shape formed by being cut out of the attachment shaft portion 28 at two positions which are located at intervals of 180 degrees in a circumferential direction to be a flat shape in parallel.

In the shock absorber 1, for example, a protruding portion of the piston rod 21 from the cylinder 2 is disposed at the upper portion and is supported by a vehicle body, and the attachment eye 13 on the cylinder 2 side is disposed at the lower portion and is connected to a wheel side. In contrast to this, the cylinder 2 side may be supported by the vehicle body and the piston rod 21 may be connected to the wheel side.

Figure 2:
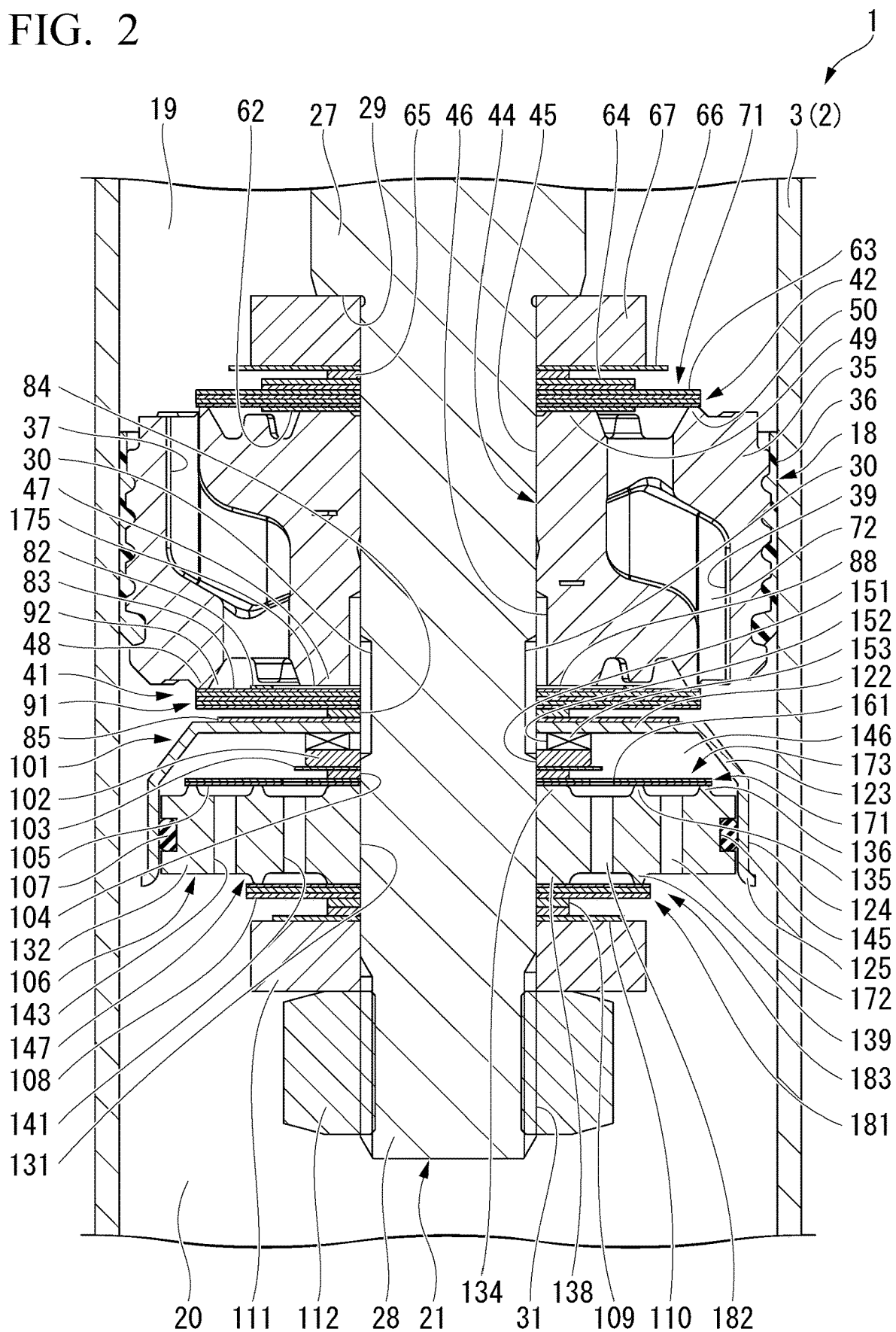
FIG. 2 is a partial cross-sectional view showing the periphery of a piston of the shock absorber according to the first embodiment of the present invention.

As shown in FIG. 2, the piston 18 is constituted by a piston main body 35 which is made of a metal and is connected to the piston rod 21 and an annular sliding member 36 which is made of a synthetic resin, is integrally mounted on the outer peripheral surface of the piston main body 35, and slides in the inner cylinder 3.

The piston main body 35 is provided with a plurality of passage holes 37 (only one is shown in FIG. 2 due to the cross section) through which the upper chamber 19 and the lower chamber 20 can communicate with each other and a plurality of passage holes 39 (only one is shown in FIG. 2 due to the cross section) through which the upper chamber 19 and the lower chamber 20 can communicate with each other. The piston main body 35 is a sintered product, and the passage holes 37 and 39 are formed at the time of sintering. Alternatively, the passage holes 37 and 39 are formed by cutting with a drill.

The plurality of passage holes 37 are formed at equal pitches with one passage hole 39 interposed therebetween in a circumferential direction of the piston main body 35, and the number of the passage holes 37 is half of the number of the passage holes 37 and 39. The plurality of passage holes 37 have a crank shape having two bending points. In the plurality of passage holes 37, one side in the axial direction of the piston 18 (i.e., an upper side in FIG. 2) is open on the outer side of the piston 18 in the radial direction, and another side in the axial direction of the piston 18 (i.e., a lower side in FIG. 2) is open on the inner side of the piston 18 in the radial direction with respect to the one side.

On the lower chamber 20 side of these passage holes 37, a first damping force generating mechanism 41 that opens and closes the passage in the passage holes 37 to generate a damping force is provided. By the first damping force generating mechanism 41 disposed on the lower chamber 20 side, the passage in the plurality of passage holes 37 becomes a passage on an extension side through which the oil liquid flows from the upper chamber 19 which becomes an upstream side toward the lower chamber 20 which becomes a downstream side at the time of the movement of the piston 18 toward the upper chamber 19, that is, in the extension stroke. The first damping force generating mechanism 41 provided for the passage in the passage holes 37 is a damping force generating mechanism on an extension side which suppresses the flow of the oil liquid from the passage in the passage holes 37 on an extension side toward the lower chamber 20 to generate a damping force.

The passage holes 39 of which the number is another half of the number of the passage holes 37 and 39 are formed at equal pitches with one passage hole 37 interposed therebetween in the circumferential direction of the piston main body 35.

The plurality of passage holes 39 have a crank shape having two bending points. In the plurality of passage holes 39, another side in the axial direction of the piston 18 (i.e., a lower side in FIG. 2) is open on the outer side of the piston 18 in the radial direction, and one side in the axial direction of the piston 18 (i.e., an upper side in FIG. 2) is open on the inner side of the piston 18 in the radial direction with respect to the other side.

On the upper chamber 19 side of these passage holes 39, a first damping force generating mechanism 42 that opens and closes the passage in the passage holes 39 to generate a damping force is provided. By the first damping force generating mechanism 42 disposed on the upper chamber 19 side, the passage in the plurality of passage holes 39 becomes a passage on a contraction side through which the oil liquid flows from the lower chamber 20 which becomes an upstream side toward the upper chamber 19 which becomes a downstream side at the time of the movement of the piston 18 toward the lower chamber 20, that is, in the contraction stroke. The first damping force generating mechanism 42 provided for the passage in the passage holes 39 is a damping force generating mechanism on a contraction side which suppresses the flow of the oil liquid from the passage in the passage holes 39 on a contraction side toward the upper chamber 19 to generate a damping force.

The piston main body 35 has substantially a disk shape. In the center of the piston main body 35 in the radial direction, an insertion hole 44 into which the attachment shaft portion 28 of the piston rod 21 is inserted is formed to penetrate the piston main body 35 in the axial direction. The insertion hole 44 has a small-diameter hole portion 45 on one side in the axial direction to which the attachment shaft portion 28 of the piston rod 21 is fitted and a large-diameter hole portion 46 on another side in the axial direction which has a diameter larger than that of the small-diameter hole portion 45.

In the end portion of the piston main body 35 on the lower chamber 20 side in the axial direction, on the inner side of the piston main body 35 in the radial direction with respect to an opening of the passage hole 37 on the lower chamber 20 side, an annular inner seat portion 47 is formed. In the end portion of the piston main body 35 on the lower chamber 20 side in the axial direction, on the outer side of the piston main body 35 in the radial direction with respect to the opening of the passage hole 37 on the lower chamber 20 side, an annular valve seat portion 48 constituting a part of the first damping force generating mechanism 41 is formed.

In the end portion of the piston main body 35 on the upper chamber 19 side in the axial direction, on the inner side of the piston main body 35 in the radial direction with respect to an opening of the passage hole 39 on the upper chamber 19 side, an annular inner seat portion 49 is formed. In the end portion of the piston main body 35 on the upper chamber 19 side in the axial direction, on the outer side of the piston main body 35 in the radial direction with respect to the opening of the passage hole 39 on the upper chamber 19 side, an annular valve seat portion 50 constituting a part of the first damping force generating mechanism 42 is formed.

In the insertion hole 44 of the piston main body 35, the large-diameter hole portion 46 is provided on the inner seat portion 47 side in the axial direction with respect to the small-diameter hole portion 45. The passage in the large-diameter hole portion 46 of the piston main body 35 constantly communicates with the passage in the passage cutout portion 30 of the piston rod 21.

The outer side of the piston main body 35 in the radial direction with respect to the valve seat portion 48 has a stepped shape having an axial height lower than that of the valve seat portion 48. The opening of the passage hole 39 on the lower chamber 20 side on a contraction side is disposed in this stepped portion. Similarly, the outer side of the piston main body 35 in the radial direction with respect to the valve seat portion 50 has a stepped shape having an axial height lower than that of the valve seat portion 50. The opening of the passage hole 37 on the upper chamber 19 side on an extension side is disposed in this stepped portion.

The first damping force generating mechanism 42 on a contraction side includes the valve seat portion 50 of the piston 18 and has, in order from the piston 18 side in the axial direction, one disk 62, a plurality (specifically, four) of disks 63 having the same inner diameter and the same outer diameter, a plurality (specifically, two) of disks 64 having the same inner diameter and the same outer diameter, one disk 65, one disk 66, and one annular member 67. The disks 62 to 66 and the annular member 67 are made of a metal. The disks 62 to 66 and the annular member 67 each have a perforated circular flat plate shape having a constant thickness into which the attachment shaft portion 28 of the piston rod 21 can be fitted.

The disk 62 has an outer diameter larger than the outer diameter of the inner seat portion 49 of the piston 18 and smaller than the inner diameter of the valve seat portion 50 of the piston 18. The disk 62 is constantly in contact with the inner seat portion 49. The plurality of disks 63 have an outer diameter substantially equal to the outer diameter of the valve seat portion 50 of the piston 18. The plurality of disks 63 can be seated on the valve seat portion 50.

The plurality of disks 64 have an outer diameter smaller than the outer diameter of the disk 63. The disk 65 has an outer diameter smaller than the outer diameter of the disk 64 and smaller than the outer diameter of the inner seat portion 49 of the piston 18. The disk 66 has an outer diameter larger than the outer diameter of the disk 64 and smaller than the outer diameter of the disk 63. The annular member 67 has an outer diameter smaller than the outer diameter of the disk 66 and larger than the outer diameter of the shaft step portion 29 of the piston rod 21. The annular member 67 is thicker and more rigid than the disks 62 to 66. The annular member 67 is in contact with the shaft step portion 29.

The plurality of disks 63 and the plurality of disks 64 constitute a main valve 71 on a contraction side which can be detached and seated with respect to the valve seat portion 50. When the main valve 71 is separated from the valve seat portion 50, the main valve 71 allows the passage in the passage hole 39 to communicate with the upper chamber 19 and suppresses the flow of oil liquid with the valve seat portion 50 to generate a damping force. The annular member 67, together with the disk 66, restricts the deformation of the main valve 71 in an opening direction beyond a specified value.

The passage between the main valve 71 and the valve seat portion 50 which appears when the valve is opened and the passage in the passage hole 39 constitute a first passage 72 on a contraction side through which the oil liquid flows from the lower chamber 20 which becomes an upstream side to the upper chamber 19 which becomes a downstream side in the cylinder 2 by the movement of the piston 18. The first damping force generating mechanism 42 on a contraction side which generates a damping force includes the main valve 71 and the valve seat portion 50. Therefore, the first damping force generating mechanism 42 is provided in the first passage 72. The first passage 72 is provided in the piston 18 including the valve seat portion 50, and the oil liquid passes through the first passage 72 when the piston rod 21 and the piston 18 move to the contraction side.

In the first damping force generating mechanism 42 on a contraction side, in each of the valve seat portion 50 and the main valve 71 in contact therewith, a fixed orifice that allows the upper chamber 19 and the lower chamber 20 to communicate with each other even when the valve seat portion 50 and the main valve 71 are in a contact state with each other is not formed. That is, the first damping force generating mechanism 42 on a contraction side does not allow the upper chamber 19 and the lower chamber 20 to communicate with each other if the valve seat portion 50 and the main valve 71 are in a contact state with each other over the entire circumference. In other words, a fixed orifice that allows the upper chamber 19 and the lower chamber 20 to constantly communicate with each other is not formed in the first passage 72, and thus the first passage 72 is not a passage that allows the upper chamber 19 and the lower chamber 20 to constantly communicate with each other.

The first damping force generating mechanism 41 on an extension side includes the valve seat portion 48 of the piston 18 and has, in order from the piston 18 side in the axial direction, one disk 82, a plurality (specifically, five) of disks 83 having the same inner diameter and the same outer diameter, one disk 84, and one disk 85. The disks 82 to 85 are made of a metal. The disks 82 to 85 each have a perforated circular flat plate shape having a constant thickness into which the attachment shaft portion 28 of the piston rod 21 can be fitted.

Figure 3:
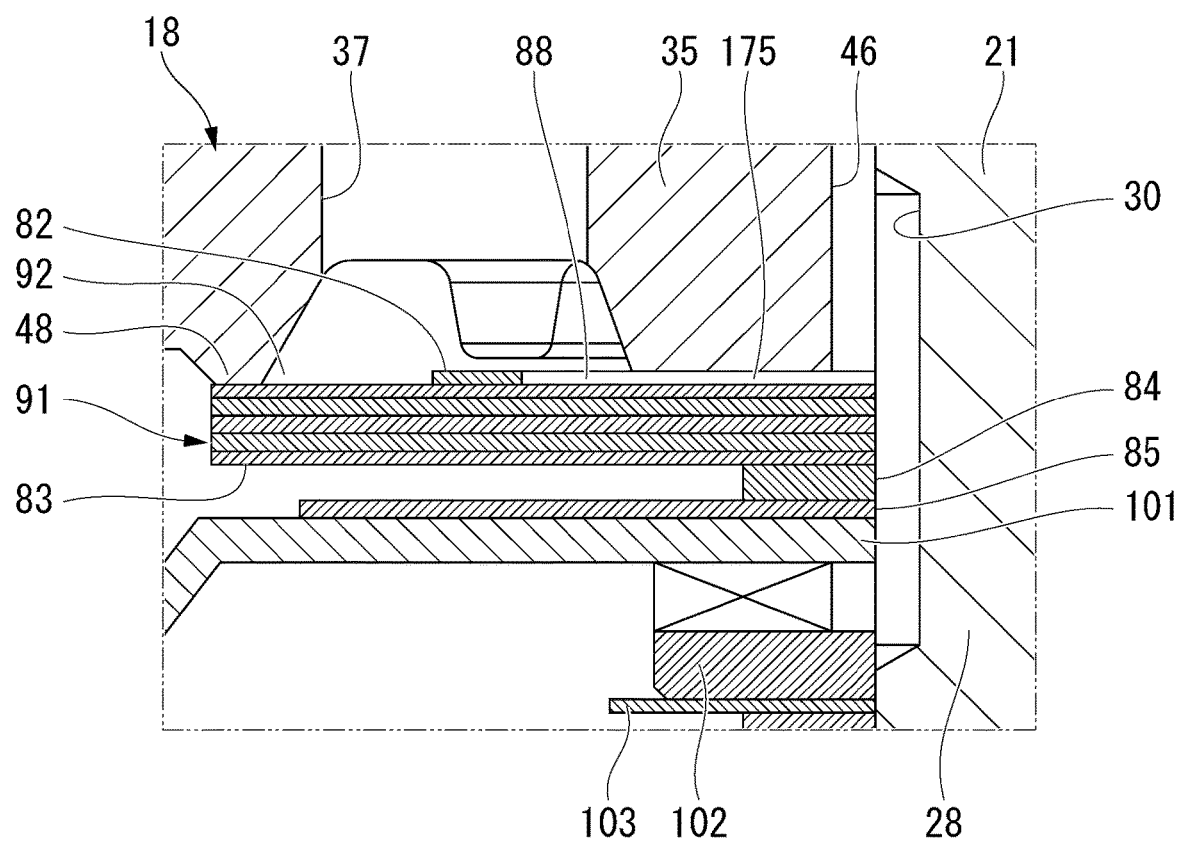
FIG. 3 is a partial cross-sectional view showing the periphery of an orifice of the shock absorber according to the first embodiment of the present invention.

The disk 82 has an outer diameter larger than the outer diameter of the inner seat portion 47 of the piston 18 and smaller than the inner diameter of the valve seat portion 48 of the piston 18. The disk 82 is constantly in contact with the inner seat portion 47. As shown in FIG. 3, in the disk 82, a cutout portion 88 that allows the passage in the passage hole 37 to constantly communicate with the passage in the large-diameter hole portion 46 of the piston 18 and the passage in the passage cutout portion 30 of the piston rod 21 is formed from an intermediate position on the outer peripheral edge portion side in the radial direction to the inner peripheral edge portion in the radial direction.

As shown in FIG. 2, the plurality of disks 83 have an outer diameter substantially equal to the outer diameter of the valve seat portion 48 of the piston 18 and can be seated on the valve seat portion 48. The disk 84 has an outer diameter smaller than the outer diameter of the disk 83 and smaller than the outer diameter of the inner seat portion 47 of the piston 18. The disk 85 has an outer diameter larger than the outer diameter of the disk 84 and smaller than the outer diameter of the disk 83.

The plurality of disks 83 constitute a main valve 91 on an extension side which can be detached and seated with respect to the valve seat portion 48. When the main valve 91 is separated from the valve seat portion 48, the main valve 91 allows the passage in the passage hole 37 to communicate with the lower chamber 20 and suppresses the flow of oil liquid with the valve seat portion 48 to generate a damping force.

The passage between the main valve 91 and the valve seat portion 48 which appears when the valve is opened and the passage in the passage hole 37 constitute a first passage 92 on an extension side through which the oil liquid flows from the upper chamber 19 which becomes an upstream side to the lower chamber 20 which becomes a downstream side in the cylinder 2 by the movement of the piston 18. The first damping force generating mechanism 41 on an extension side which generates a damping force includes the main valve 91 and the valve seat portion 48. Therefore, the first damping force generating mechanism 41 is provided in the first passage 92. The first passage 92 is provided in the piston 18 including the valve seat portion 48, and the oil liquid passes through the first passage 92 when the piston rod 21 and the piston 18 move to the extension side.

In the first damping force generating mechanism 41 on an extension side, in each of the valve seat portion 48 and the main valve 91 in contact therewith, a fixed orifice that allows the upper chamber 19 and the lower chamber 20 to communicate with each other even when the valve seat portion 48 and the main valve 91 are in a contact state with each other is not formed. That is, the first damping force generating mechanism 41 on an extension side does not allow the upper chamber 19 and the lower chamber 20 to communicate with each other if the valve seat portion 48 and the main valve 91 are in a contact state with each other over the entire circumference. In other words, a fixed orifice that allows the upper chamber 19 and the lower chamber 20 to constantly communicate with each other is not formed in the first passage 92, and thus the first passage 92 is not a passage that allows the upper chamber 19 and the lower chamber 20 to constantly communicate with each other.

On a side of the first damping force generating mechanism 41 on the extension side opposite to the piston 18, in order from the first damping force generating mechanism 41 side, one cap member 101, one passage forming member 102, one disk 103, one disk 104, a plurality (specifically, two) of disks 105 having the same inner diameter and the same outer diameter, one valve seat member 106 provided with one O-ring 107 on the outer peripheral side thereof, a plurality (specifically, three) of disks 108 having the same inner diameter and the same outer diameter, a plurality (specifically, two) of disks 109 having the same inner diameter and the same outer diameter, one disk 110, and one annular member 111 are provided with the attachment shaft portion 28 of the piston rod 21 fitted to the inside of each of them. In the attachment shaft portion 28 of the piston rod 21, at a portion protruding to the side opposite to the piston 18 with respect to the annular member 111, the male screw 31 is formed. A nut 112 is screwed to the male screw 31. The nut 112 is in contact with the annular member 111.

The cap member 101, the passage forming member 102, the disks 103 to 105, the valve seat member 106, the disks 108 to 110, and the annular member 111 are all made of a metal. The disks 103 to 105 and 108 to 110 and the annular member 111 each have a perforated circular flat plate shape having a constant thickness into which the attachment shaft portion 28 of the piston rod 21 can be fitted. The cap member 101, the passage forming member 102, and the valve seat member 106 each have an annular shape into which the attachment shaft portion 28 of the piston rod 21 can be fitted.

The cap member 101 is an integrally formed product which has a bottomed tubular shape. The cap member 101 is formed by a drawing process of a metal plate. The cap member 101 has a bottom portion 122 having a perforated disk shape, an intermediate tapered portion 123 that extends from the outer peripheral edge portion of the bottom portion 122 while expanding in diameter to one side of the bottom portion 122 in the axial direction, a cylindrical tubular portion 124 that extends from the end edge portion of the intermediate tapered portion 123 on a side opposite to the bottom portion 122 in a direction opposite to the bottom 122, and an opening diameter-expanded portion 125 that extends from the end edge portion of the tubular portion 124 on a side opposite to the intermediate tapered portion 123 while expanding in diameter in a direction opposite to the intermediate tapered portion 123. The cap member 101 is disposed to be oriented such that the bottom portion 122 faces the piston 18 side. The cap member 101 is fitted to the attachment shaft portion 28 at the inner peripheral portion of the bottom portion 122.

The cap member 101 has substantially a constant thickness, and the outer diameter of the bottom portion 122 is equal to the outer diameter of the disk 83 constituting the main valve 91. The cap member 101 is thicker than the disk 83 and has a bottomed tubular shape, and thus has a rigidity higher than that of the disk 83. Therefore, the cap member 101 is in contact with the disk 85 and thus restricts the deformation of the main valve 91 constituted by the plurality of disks 83 in the opening direction beyond a specified value.

The valve seat member 106 has a main body portion 132 having a perforated disk shape in which a through hole 131 is formed in the center in the radial direction. The through hole 131 penetrates the main body portion 132 in a thickness direction. The attachment shaft portion 28 is inserted into the through hole 131. The valve seat member 106 has, on one side of the main body portion 132 in the axial direction, an inner seat portion 134, an intermediate valve seat portion 135, and an outer valve seat portion 136 in order from the inner side of the main body portion 132 in the radial direction and has, on another side of the main body portion 132 in the axial direction, an inner seat portion 138 and a valve seat portion 139 in order from the inner side of the main body portion 132 in the radial direction.

The inner seat portion 134 has an annular shape and projects from the inner peripheral edge portion of the main body portion 132 to one side of the main body portion 132 in the axial direction. The intermediate valve seat portion 135 also has an annular shape and projects from an intermediate position of the main body portion 132 in the radial direction to the same side of the main body portion 132 in the axial direction as in the inner seat portion 134. The outer valve seat portion 136 also has an annular shape and projects from an outer peripheral side of the main body portion 132 in the radial direction to the same side of the main body portion 132 in the axial direction as in the inner seat portion 134.

The inner seat portion 138 also has an annular shape and projects from the inner peripheral edge portion of the main body portion 132 to a side of the main body portion 132 opposite to the inner seat portion 134 in the axial direction. The inner seat portions 134 and 138 each have a through hole 131 on the inner side in the radial direction and have the same outer diameter. The valve seat portion 139 also has an annular shape and projects from an intermediate position of the main body portion 132 in the radial direction to the same side of the main body portion 132 in the axial direction as in the inner seat portion 138. The intermediate valve seat portion 135 and the valve seat portion 139 have the same inner diameter and the same outer diameter.

In the main body 132, between the inner seat portions 134 and 138 and the intermediate valve seat portion 135 and the valve seat portion 139, an inner passage hole 141 that penetrates the main body portion 132 in the axial direction is formed. A plurality of inner passage holes 141 are formed at equal intervals in the circumferential direction of the main body portion 132. In the main body portion 132, between the intermediate valve seat portion 135 and the outer valve seat portion 136 and on the outer side in the radial direction with respect to the valve seat portion 139, an outer passage hole 143 that penetrates the main body portion 132 in the axial direction is formed. The outer passage hole 143 is disposed on the outer side of the main body portion 132 in the radial direction with respect to the inner passage hole 141. A plurality of outer passage holes 143 are formed at equal intervals in the circumferential direction of the main body portion 132.

In the main body portion 132, at an intermediate position of the outer peripheral portion in the axial direction, an annular seal groove 145 which is recessed inward in the radial direction is formed. The O-ring 107 is disposed in the seal groove 145. In the valve seat member 106, in a state in which the inner seat portion 134, the intermediate valve seat portion 135, and the outer valve seat portion 136 face the bottom portion 122 side, the main body portion 132 is fitted to the tubular portion 124 of the cap member 101. Therefore, the valve seat member 106 is provided in the cap member 101. In this state, the O-ring 107 seals the gap between the tubular portion 124 of the cap member 101 and the main body portion 132 of the valve seat member 106. The valve seat member 106 is fitted to the attachment shaft portion 28 in the through hole 131.

The cap member 101, the valve seat member 106, and the O-ring 107 constitute a housing 147 that forms a cap chamber 146 inside. The cap chamber 146 is provided between the bottom portion 122 of the cap member 101 and the valve seat member 106 in the housing 147. The passage forming member 102, the disk 103, the disk 104, and the plurality of disks 105 are provided in the cap chamber 146. In the valve seat member 106, the intermediate valve seat portion 135 and the outer valve seat portion 136 are disposed on the cap chamber 146 side, and the valve seat portion 139 is disposed on the lower chamber 20 side. The housing 147 is disposed in the lower chamber 20 including the annular valve seat member 106. The valve seat member 106 divides the cap chamber 146 and the lower chamber 20 from each other and is provided to face both the cap chamber 146 and the lower chamber 20.

The passage forming member 102 has an outer diameter smaller than the outer diameter of the bottom portion 122 of the cap member 101. In the center of the passage forming member 102 in the radial direction, on one side in the axial direction, a small-diameter fitting hole 151 is formed, and on another side in the axial direction, a large-diameter hole 152 having a diameter larger than that of the small-diameter fitting hole 151 is formed. In the passage forming member 102, on the large-diameter hole 152 side in the axial direction, a passage groove 153 that penetrates the passage forming member 102 from the large-diameter hole 152 to the outer peripheral surface of the passage forming member 102 in the radial direction is formed. A plurality of passage grooves 153 are provided side by side at equal intervals in the circumferential direction of the passage forming member 102. The passage forming member 102 is formed in such a shape from one member by, for example, a cutting process. The passage forming member 102 is disposed to be oriented such that the large-diameter hole 152 and the passage groove 153 face the bottom portion 122 side. The passage forming member 102 is fitted to the attachment shaft portion 28 in the small-diameter fitting hole 151. In the passage forming member 102, the passage in the large-diameter hole 152 constantly communicates with the passage in the passage cutout portion 30 of the piston rod 21.

The passage in the large-diameter hole 152 and the passage in the passage groove 153 of the passage forming member 102 constantly communicate with the cap chamber 146 and the passage in the passage cutout portion 30 of the piston rod 21. Therefore, the cap chamber 146 constantly communicates with the upper chamber 19 via the passage in the large-diameter hole 152 and the passage in the passage groove 153 of the passage forming member 102, the passage in the passage cutout portion 30 of the piston rod 21, the passage in the large-diameter hole portion 46 of the piston 18, the passage in the cutout portion 88 of the disk 82, and the passage in the passage hole 37 of the piston 18.

The plurality of disks 105 have an outer diameter substantially equal to the outer diameter of the outer valve seat portion 136 of the valve seat member 106. The plurality of disks 105 are constantly in contact with the inner seat portion 134 and can be seated on the outer valve seat portion 136 and the intermediate valve seat portion 135. In the plurality of disks 105, at intermediate positions in the radial direction between the inner seat portion 134 and the intermediate valve seat portion 135, through holes 161 penetrating the disks 105 in the axial direction are formed. The passage in the through hole 161 allows the passage in the inner passage hole 141 of the valve seat member 106 to constantly communicate with the cap chamber 146.

The disk 104 has an outer diameter smaller than the outer diameter of the disk 105 and the outer diameter of the passage forming member 102 and substantially the same as the outer diameter of the inner seat portion 134 of the valve seat member 106. The disk 103 has an outer diameter larger than the maximum outer diameter of the passage forming member 102 and smaller than the outer diameter of the disk 105.

The plurality of disks 105 constitute a sub valve 171 (i.e., a second sub valve) that can be detached and seated with respect to the outer valve seat portion 136 and the intermediate valve seat portion 135. The sub valve 171 is provided in the cap chamber 146. When the sub valve 171 is separated from the outer valve seat portion 136 in the cap chamber 146, the sub valve 171 allows the passage in the outer passage hole 143 and the cap chamber 146 to communicate with each other, and thus allows the lower chamber 20 to communicate with the passage in the passage hole 37, that is, the upper chamber 19. At this time, the sub valve 171 suppresses the flow of the oil liquid with the outer valve seat portion 136 to generate a damping force. The sub valve 171 is an inflow valve that opens when the oil liquid flows into the cap chamber 146 from the lower chamber 20 through the passage in the outer passage hole 143. The sub valve 171 is a check valve that restricts the inflow of the oil liquid from the cap chamber 146 to the lower chamber 20 through the passage in the outer passage hole 143.

The passage in the outer passage hole 143, the passage between the sub valve 171 and the outer valve seat portion 136 which appears when the valve is opened, the cap chamber 146, the passages in the passage groove 153 and the large-diameter hole 152 of the passage forming member 102, the passage in the passage cutout portion 30 of the piston rod 21, the passage in the large-diameter hole portion 46 of the piston 18, the passage in the cutout portion 88 of the disk 82, and the passage in the passage hole 37 constitute a second passage 172 through which the oil liquid flows from the lower chamber 20 which becomes an upstream side to the upper chamber 19 which becomes a downstream side in the cylinder 2 by the movement of the piston 18. The second passage 172 becomes a passage on a contraction side through which the oil liquid flows from the lower chamber 20 which becomes an upstream side toward the upper chamber 19 which becomes a downstream side at the time of the movement of the piston 18 toward the lower chamber 20, that is, in the contraction stroke. The second passage 172 includes the passage in the passage cutout portion 30 formed by being cut out of the piston rod 21. In other words, a part of the second passage 172 is formed by being cut out of the piston rod 21.

The sub valve 171, the outer valve seat portion 136 and the intermediate valve seat portion 135, the disks 103 and 104, the passage forming member 102, and the cap member 101 constitute a second damping force generating mechanism 173 on a contraction side. The second damping force generating mechanism 173 is provided in the second passage 172 on a contraction side. The second damping force generating mechanism 173 opens and closes the second passage 172 and suppresses the flow of the oil liquid from the second passage 172 to the upper chamber 19 to generate a damping force. In other words, in the second damping force generating mechanism 173, the outer valve seat portion 136 and the intermediate valve seat portion 135 are provided in the valve seat member 106. The sub valve 171 constituting the second damping force generating mechanism 173 on a contraction side is a sub valve on a contraction side.

In the second passage 172, when the second damping force generating mechanism 173 is in an opened state, the passage in the cutout portion 88 of the disk 82 becomes the narrowest among portions in which a flow path cross-sectional area is fixed and becomes an orifice 175 in the second passage 172. The orifice 175 is disposed on a downstream side from the sub valve 171 in the flow of the oil liquid when the oil liquid flows through the second passage 172 and the sub valve 171 is opened.

In the second damping force generating mechanism 173 on a contraction side, in each of the outer valve seat portion 136, the intermediate valve seat portion 135, and the sub valve 171 in contact therewith, a fixed orifice that allows the upper chamber 19 and the lower chamber 20 to communicate with each other even when the outer valve seat portion 136 and the intermediate valve seat portion 135 and the sub valve 171 are in contact state with each other is not formed. That is, the second damping force generating mechanism 173 on a contraction side does not allow the upper chamber 19 and the lower chamber 20 to communicate with each other if the outer valve seat portion 136, the intermediate valve seat portion 135, and the disk 105 are in a contact state with each other over the entire circumference. In other words, a fixed orifice that allows the upper chamber 19 and the lower chamber 20 to constantly communicate with each other is not formed in the second passage 172, and thus the second passage 172 is not a passage that allows the upper chamber 19 and the lower chamber 20 to constantly communicate with each other. The passage forming member 102 is thicker and more rigid than the disk 105 constituting the sub valve 171. The passage forming member 102, together with the disk 103, restricts the deformation of the sub valve 171 in the opening direction beyond a specified value.

The second passage 172 on a contraction side through which the upper chamber 19 and the lower chamber 20 can communicate with each other is parallel to the first passage 72 which is also a passage on a contraction side through which the upper chamber 19 and the lower chamber 20 can communicate with each other. The first damping force generating mechanism 42 is provided in the first passage 72. The second damping force generating mechanism 173 is provided in the second passage 172. Therefore, the first damping force generating mechanism 42 and the second damping force generating mechanism 173 on a contraction side are disposed in parallel.

The plurality of disks 108 have an outer diameter substantially equal to the outer diameter of the valve seat portion 139 of the valve seat member 106, is constantly in contact with the inner seat portion 138, and can be seated on the valve seat portion 139. The disk 108 has an outer diameter smaller than the outer diameter of the disk 105 and has a rigidity higher than that of the disk 105.

The plurality of disks 109 have an outer diameter smaller than the outer diameter of the disk 108 and substantially the same as the outer diameter of the inner seat portion 138 of the valve seat member 106. The disk 110 has an outer diameter larger than the outer diameter of the disk 109 and smaller than the outer diameter of the disk 108.

The annular member 111 has an outer diameter larger than the outer diameter of the disk 110 and slightly smaller than the outer diameter of the disk 108 and is thicker and more rigid than the disk 108.

The plurality of disks 108 constitute a sub valve 181 (i.e., a first sub valve) that can be detached and seated with respect to the valve seat portion 139. The sub valve 181 is provided in the lower chamber 20. When the sub valve 181 is separated from the valve seat portion 139, the sub valve 181 allows the cap chamber 146 and the lower chamber 20 to communicate with each other through the passage in the through hole 161 of the disk 105 and the passage in the inner passage hole 141. As a result, the sub valve 181 allows the upper chamber 19 to communicate with the lower chamber 20. At this time, the sub valve 181 suppresses the flow of the oil liquid with the valve seat portion 139 to generate a damping force. The sub valve 181 is a discharge valve that opens when the oil liquid is discharged from the cap chamber 146 to the lower chamber 20 through the passage in the through hole 161 of the disk 105 and the passage in the inner passage hole 141. The sub valve 181 is a check valve that restricts the inflow of the oil liquid from the lower chamber 20 into the cap chamber 146 through the passage in the inner passage hole 141.

The passage in the passage hole 37 of the piston 18, the passage in the cutout portion 88 of the disk 82, the passage in the large-diameter hole portion 46 of the piston 18, the passage in the passage cutout portion 30 of the piston rod 21, the passages in the large-diameter hole 152 and the passage groove 153 of the passage forming member 102, the cap chamber 146, the passage in the through hole 161 of the disk 105, the passage in the inner passage hole 141, and the passage between the sub valve 181 and the valve seat portion 139 which appears when the valve is opened constitute a second passage 182 through which the oil liquid flows from the upper chamber 19 which becomes a downstream side to the lower chamber 20 which becomes an upstream side in the cylinder 2 by the movement of the piston 18. The second passage 182 becomes a passage on an extension side through which the oil liquid flows from the upper chamber 19 which becomes an upstream side toward the lower chamber 20 which becomes a downstream side at the time of the movement of the piston 18 toward the upper chamber 19, that is, in the extension stroke. The second passage 182 includes the passage in the passage cutout portion 30 formed by being cut out of the piston rod 21. In other words, a part of the second passage 182 is formed by being cut out of the piston rod 21.

The sub valve 181, the valve seat portion 139, the plurality of disks 109, the disk 110, and an annular member 111 constitute a second damping force generating mechanism 183 on an extension side. The second damping force generating mechanism 183 is provided in the second passage 182 on an extension side. The second damping force generating mechanism 183 opens and closes the second passage 182 and suppresses the flow of the oil liquid from the second passage 182 to the lower chamber 20 to generate a damping force. In other words, in the second damping force generating mechanism 183, the valve seat portion 139 is provided in the valve seat member 106. The sub valve 181 constituting the second damping force generating mechanism 183 on an extension side is a sub valve on an extension side.

In the second passage 182, when the second damping force generating mechanism 183 is in an opened state, the passage in the cutout portion 88 of the disk 82 becomes the narrowest among portions in which a flow path cross-sectional area is fixed and becomes the orifice 175 also in the second passage 182. The orifice 175 is common to the second passages 172 and 182. The orifice 175 is disposed on an upstream side from the sub valve 181 in the flow of the oil liquid when the oil liquid flows through the second passage 182 and the sub valve 181 is opened. The orifice 175 is formed by being cut out of a disk 82 in the first damping force generating mechanism 41, the disc 82 which is in contact with the piston 18.

The disk 108 constituting the sub valve 181 has a rigidity higher than that of the disk 105 constituting the sub valve 171, and the sub valve 181 has a rigidity higher than that of the sub valve 171. Therefore, the sub valve 171, which is an inflow valve into the cap chamber 146, has a valve opening pressure lower than that of the sub valve 181 which is a discharge valve from the inside of the cap chamber 146. The sub valve 181 and the sub valve 171 are independently opened and closed.

In the second damping force generating mechanism 183 on an extension side, in each of the valve seat portion 139 and the disk 108 in contact therewith, a fixed orifice that allows the upper chamber 19 and the lower chamber 20 to communicate with each other even when the valve seat portion 139 and the disk 108 are in a contact state with each other is not formed. That is, the second damping force generating mechanism 183 on an extension side does not allow the upper chamber 19 and the lower chamber 20 to communicate with each other if the valve seat portion 139 and the disk 108 are in a contact state with each other over the entire circumference. In other words, a fixed orifice that allows the upper chamber 19 and the lower chamber 20 to constantly communicate with each other is not formed in the second passage 182, and thus the second passage 182 is not a passage that allows the upper chamber 19 and the lower chamber 20 to constantly communicate with each other. The annular member 111, together with the disk 110, restricts the deformation of the sub valve 181 in the opening direction beyond a specified value.

In the shock absorber 1, as a flow for passing the oil liquid in the axial direction at least in the piston 18, the upper chamber 19 and the lower chamber 20 can communicate with each other via only the first damping force generating mechanisms 41 and 42 and the second damping force generating mechanisms 173 and 183. Therefore, in the shock absorber 1, on the passage of the oil liquid that passes through at least the inside of the piston 18 in the axial direction, a fixed orifice that allows the upper chamber 19 and the lower chamber 20 to constantly communicate with each other is not provided.

The second passage 182 on an extension side through which the upper chamber 19 and the lower chamber 20 can communicate with each other is parallel to the first passage 92 which is also a passage on an extension side through which the upper chamber 19 and the lower chamber 20 can communicate with each other, except for the passage in the passage hole 37 on the upper chamber 19 side. In the parallel portion between the second passage 182 and the first passage 92, the first passage 92 is provided with the first damping force generating mechanism 41, and the second passage 182 is provided with the second damping force generating mechanism 183. Therefore, the first damping force generating mechanism 41 and the second damping force generating mechanism 183 on an extension side are disposed in parallel.

The second damping force generating mechanisms 173 and 183 include the valve seat member 106, the sub valve 181 provided on one side (i.e., the lower chamber 20 side) and the sub valve 171 provided on another side (i.e., the upper chamber 19 side) of the second passages 172 and 182 provided in the valve seat member 106, and a bottomed tubular cap member 101 provided between the piston 18 and the valve seat member 106 in the second passages 172 and 182. The sub valve 181 is provided on the lower chamber 20 side of the valve seat member 106, and the sub valve 171 is provided in the cap chamber 146 formed between the bottom portion 122 of the cap member 101 and the valve seat member 106.

As shown in FIG. 1, the above-mentioned base valve 25 is provided between the bottom member 12 of the outer cylinder 4 and the inner cylinder 3. The base valve 25 includes a base valve member 191 that separates the lower chamber 20 and the reservoir chamber 6 from each other, a disk 192 provided on the lower side of the base valve member 191, that is, on the reservoir chamber 6 side, a disk 193 provided on the upper side of the base valve member 191, that is, on the lower chamber 20 side, and an attachment pin 194 that attaches the disk 192 and the disk 193 to the base valve member 191.

The base valve member 191 has an annular shape. The attachment pin 194 is inserted into the center of the base valve member 191 in the radial direction. In the base valve member 191, a plurality of passage holes 195 through which the oil liquid can flow between the lower chamber 20 and the reservoir chamber 6, and a plurality of passage holes 196 through which the oil liquid can flow between the chamber 20 and the reservoir chamber 6 on the outer side of the base valve member 191 in the radial direction with respect to the passage holes 195 are formed. The disk 192 on the reservoir chamber 6 side suppresses the flow of the oil liquid from the reservoir chamber 6 to the lower chamber 20 through the passage hole 195 while allowing the flow of the oil liquid from the lower chamber 20 to the reservoir chamber 6 through the passage hole 195. The disk 193 suppresses the flow of the oil liquid from the lower chamber 20 to the reservoir chamber 6 through the passage hole 196 while allowing the flow of the oil liquid from the reservoir chamber 6 to the lower chamber 20 through the passage hole 196.

The disk 192, together with the base valve member 191, constitutes a damping valve mechanism 197 on a contraction side of which a valve is opened in the contraction stroke of the shock absorber 1 to allow the oil liquid to flow from the lower chamber 20 to the reservoir chamber 6 and generate a damping force. The disk 193 and the base valve member 191 constitute a suction valve mechanism 198 of which a valve is opened in the extension stroke of the shock absorber 1 to allow the oil liquid to flow from the reservoir chamber 6 into the lower chamber 20. The suction valve mechanism 198 executes a function of allowing the oil liquid to flow from the reservoir chamber 6 to the lower chamber 20 without substantially generating a damping force to supplement for the shortage of the liquid mainly caused the extension of the piston rod 21 from the cylinder 2.

As shown in FIG. 2, in a case in which the piston 18 or the like is assembled to the piston rod 21, the annular member 67, the disk 66, the disk 65, the plurality of disks 64, the plurality of disks 63, the disk 62, and the piston 18 are superposed on the shaft step portion 29 in order while the attachment shaft portion 28 of the piston rod 21 is inserted. At this time, the piston 18 is oriented such that the small-diameter hole portion 45 faces the shaft step portion 29 side. In addition, the disk 82, the plurality of disks 83, the disk 84, the disk 85, and the cap member 101 are superposed on the piston 18 in order while the attachment shaft portion 28 is inserted. At this time, the cap member 101 is oriented such that the opening diameter-expanded portion 125 faces the side opposite to the piston 18, and at the bottom portion 122, the cap member 101 is in contact with the disk 85. Further, the passage forming member 102 is superposed on the bottom portion 122 of the cap member 101 while the attachment shaft portion 28 is inserted. At this time, the passage forming member 102 is oriented such that the large-diameter hole 152 and the passage groove 153 face the bottom portion 122 side.

In addition, the disk 103, the disk 104, the plurality of disks 105, and the valve seat member 106 on which the O-ring 107 is mounted are superposed on the passage forming member 102 while the attachment shaft portion 28 is inserted. At this time, in the valve seat member 106, the inner seat portion 134, the intermediate valve seat portion 135, and the outer valve seat portion 136 are oriented to face the plurality of disks 105, and the main body portion 132 and the O-ring 107 are fitted to the tubular portion 124 of the cap member 101. Further, the plurality of disks 108, the plurality of disks 109, the disk 110, and the annular member 111 are superposed on the valve seat member 106 while the attachment shaft portion 28 is inserted. In this state, the nut 112 is screwed to the male screw 31 of the piston rod 21 projecting with respect to the annular member 111, and the nut 112 and the shaft step portion 29 clamp the inner peripheral side of the above-described constituent elements in the axial direction.

In this state, the inner peripheral side of the main valve 71 is clamped between the inner seat portion 49 of the piston 18 and the disk 65 via the disk 62, and the main valve 71 is in contact with the valve seat portion 50 of the piston 18 over the entire circumference. In this state, the inner peripheral side of the main valve 91 is clamped between the inner seat portion 47 of the piston 18 and the disk 84 via the disk 82, and the main valve 91 is in contact with the valve seat portion 48 of the piston 18 over the entire circumference. In this state, the inner peripheral side of the sub valve 171 is clamped between the inner seat portion 134 of the valve seat member 106 and the disk 104, and the sub valve 171 is in contact with the intermediate valve seat portion 135 and the outer valve seat portion 136 of the valve seat member 106 over the entire circumference. In this state, the inner peripheral side of the sub valve 181 is clamped between the inner seat portion 138 of the valve seat member 106 and the disk 109, and the sub valve 181 is in contact with the valve seat portion 139 of the valve seat member 106 over the entire circumference.

Figure 4:
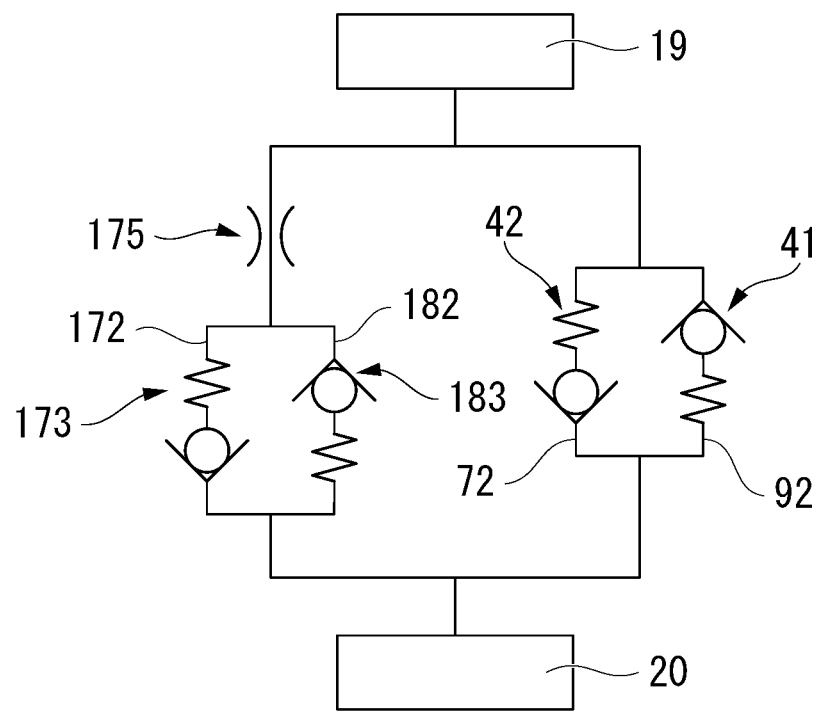
FIG. 4 is a hydraulic circuit diagram of the shock absorber according to the first embodiment of the present invention.

A hydraulic circuit diagram of the shock absorber 1 of the above first embodiment is shown in FIG. 4. As shown in FIG. 4, the first damping force generating mechanism 41 on an extension side is provided in the first passage 92 on an extension side which connects the upper chamber 19 and the lower chamber 20 to each other. In parallel with the first damping force generating mechanism 41, the second damping force generating mechanism 183 on an extension side is provided in the second passage 182 on an extension side which connects the upper chamber 19 and the lower chamber 20 to each other. The first damping force generating mechanism 42 on a contraction side is provided in the first passage 72 on a contraction side which connects the lower chamber 20 and the upper chamber 19 to each other. In parallel with the first damping force generating mechanism 42, the second damping force generating mechanism 173 on a contraction side is provided in the second passage 172 on a contraction side which connects the lower chamber 20 and the upper chamber 19 to each other. The orifice 175 is provided in a common portion of the second passages 172 and 182 on the upper chamber 19 side with respect to the second damping force generating mechanisms 173 and 183. As described above, the shock absorber 1 is not provided with a fixed orifice that allows the upper chamber 19 and the lower chamber 20 to constantly communicate with each other.

As shown in FIG. 2, between the first damping force generating mechanism 41 on an extension side and the second damping force generating mechanism 183 on an extension side, the main valve 91 of the first damping force generating mechanism 41 has a rigidity and a valve opening pressure higher than those of the sub valve 181 of the second damping force generating mechanism 183. Therefore, in the extension stroke, in an extremely low speed region in which a piston speed is lower than a predetermined value, the valve of the second damping force generating mechanism 183 is opened in a state in which the valve of the first damping force generating mechanism 41 is closed. In a normal speed region in which the piston speed is this predetermined value or more, the valve of the first damping force generating mechanism 41 and the valve of the second damping force generating mechanism 183 are both opened. The sub valve 181 is an extremely low speed valve which is opened to generate a damping force in a region in which the piston speed is extremely low.

Figure 5:
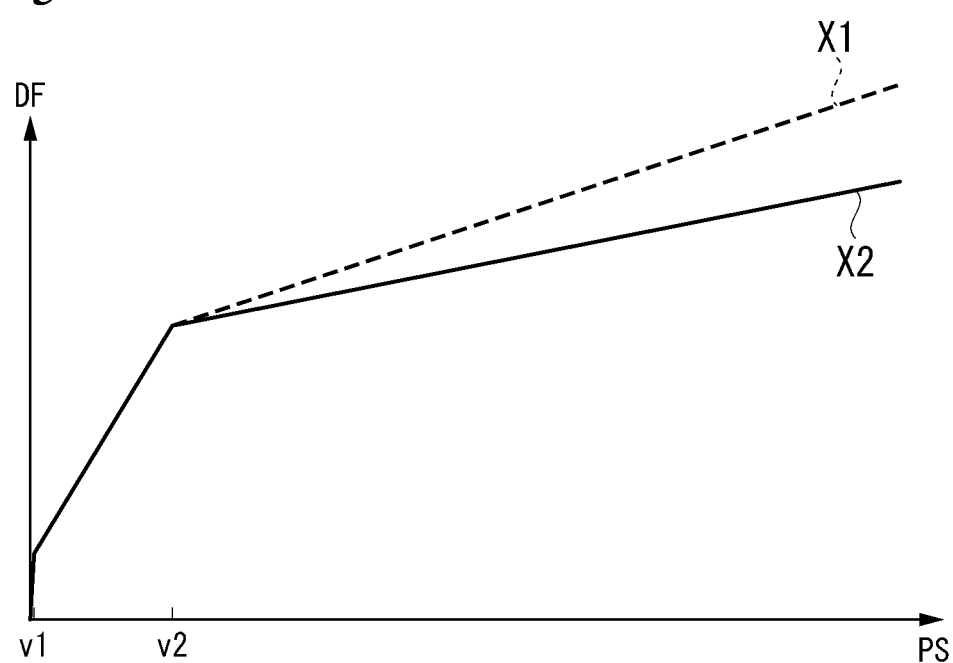
FIG. 5 is a characteristic diagram showing damping force characteristics in an extension stroke of the shock absorber according to the first embodiment of the present invention.

That is, in the extension stroke, as the piston 18 moves toward the upper chamber 19, the pressure of the upper chamber 19 increases and the pressure of the lower chamber 20 decreases, but, since each of the first damping force generating mechanisms 41 and 42 and the second damping force generating mechanisms 173 and 183 does not have a fixed orifice, the oil liquid does not flow until the valve of the second damping force generating mechanism 183 is opened. Therefore, as shown in FIG. 5, the damping force (i.e., DF) rises steeply in the extension stroke when the piston speed (i.e., PS) is less than a first predetermined value v1. In a region in which the piston speed (i.e., PS) is higher than the first predetermined value v1 at which the valve of the second damping force generating mechanism 183 is opened and in an extremely low speed region in which the piston speed (i.e., PS) is higher than the first predetermined value v1 and lower than a second predetermined value v2 (i.e., v1 or more and less than v2), the valve of the second damping force generating mechanism 183 is opened in a state in which the valve of the first damping force generating mechanism 41 is closed.

That is, the sub valve 181 is separated from the valve seat portion 139, and the upper chamber 19 and the lower chamber 20 communicate with each other through the second passage 182 on an extension side. Therefore, the oil liquid in the upper chamber 19 flows to the lower chamber 20 via the passage in the passage hole 37 of the piston 18, the orifice 175, the passage in the large-diameter hole portion 46 of the piston 18, the passage in the passage cutout portion 30 of the piston rod 21, the passages in the large-diameter hole 152 and the passage groove 153 of the passage forming member 102, the cap chamber 146, the passage in the through hole 161 of the sub valve 171, the passage in the inner passage hole 141, and the passage between the sub valve 181 and the valve seat portion 139. As a result, even in the extremely low speed region in which the piston speed (i.e., PS) is lower than the second predetermined value v2 (i.e., v1 or more and less than v2), the damping force of the valve characteristics (i.e., the characteristics in which the damping force is substantially proportional to the piston speed) can be obtained.

In the extension stroke, in the normal speed region in which the piston speed is the second predetermined value v2 or more, the valve of the first damping force generating mechanism 41 is opened while a state in which the valve of the second damping force generating mechanism 183 is opened remains. That is, the sub valve 181 is separated from the valve seat portion 139, and the oil liquid flows from the upper chamber 19 to the lower chamber 20 through the second passage 182 on an extension side. At this time, the flow of the oil liquid is throttled by the orifice 175 provided on the downstream side from the main valve 91 in the second passage 182, and thus the pressure applied to the main valve 91 increases and a differential pressure increases, the main valve 91 is separated from the valve seat portion 48, and the oil liquid flows from the upper chamber 19 to the lower chamber 20 through the first passage 92 on an extension side. Therefore, the oil liquid in the upper chamber 19 flows to the lower chamber 20 via the passage in the passage hole 37 and the passage between the main valve 91 and the valve seat portion 48.

Here, in the extension stroke, in the normal speed region in which the piston speed (i.e., PS) is the second predetermined value v2 or more, the differential pressure between the upper chamber 19 and the lower chamber 20 is higher than that in the low speed region in which the piston speed (i.e., PS) is the first predetermined value v1 or more and less than the second predetermined value v2, but, since the first passage 92 is not throttled by the orifice, it is possible to allow the oil liquid to flow via the first passage 92 at a large flow rate by the main valve 91 being opened. By this and by throttling the second passage 182 with the orifice 175, it is possible to prevent the sub valve 181 from being deformed.

At this time, pressures in opposite directions from the lower chamber 20 and the cap chamber 146 are applied to the sub valve 171 in a closed state. Even if the differential pressure between the upper chamber 19 and the lower chamber 20 becomes large, since the orifice 175 is formed on the upstream side from the sub valve 171 in the second passage 182, the pressure increase in the cap chamber 146 becomes gentle with respect to the pressure increase in the upper chamber 19, which prevents the pressure difference between the cap chamber 146 and the lower chamber 20 from becoming large. Therefore, it is possible to prevent the pressure difference between the cap chamber 146 and the lower chamber 20 received by the closed sub valve 171 in a closed state from becoming large, and it is possible to prevent the large back pressure from the cap chamber 146 side toward the lower chamber 20 side from being applied to the sub valve 171.

The shock absorber 1 is provided with, as a flow path through which the oil liquid flows from the upper chamber 19 to the lower chamber 20 in the extension stroke, the first passage 92 and the second passage 182 in parallel and is provided with the main valve 91 and the sub valve 181 in parallel. The orifice 175 is connected in series with the sub valve 181.

As described above, in the extension stroke, in the normal speed region in which the piston speed (i.e., PS) is the second predetermined value v2 or more, it is possible to allow the oil liquid to flow via the first passage 92 at a large flow rate by the main valve 91 being opened. As a result, the flow rate of the oil liquid flowing through the passage between the sub valve 181 and the valve seat portion 139 is reduced. Therefore, the valve rigidity of the sub valve 181 can be reduced.

Therefore, for example, as shown in FIG. 5, the rate of the increase of the damping force (i.e., DF) with respect to the increase in the piston speed in the normal speed region (i.e., v2 or more) for the piston speed (i.e., PS) can be reduced from a broken line X1 to a solid line X2. In other words, the inclination of the rate of the increase of the damping force (i.e., DF) on the extension side with respect to the increase in the piston speed (i.e., PS) in the normal speed region (i.e., v2 or more) can be made lower than that in the extremely low speed region (i.e., less than v2). As a result, the degree of freedom in design can be expanded.

Between the first damping force generating mechanism 42 on a contraction side and the second damping force generating mechanism 173 on a contraction side, the main valve 71 of the first damping force generating mechanism 42 has a rigidity and a valve opening pressure higher than those of the sub valve 171 of the second damping force generating mechanism 173. Therefore, in the contraction stroke, in an extremely low speed region in which a piston speed is lower than a predetermined value, the valve of the second damping force generating mechanism 173 is opened in a state in which the valve of the first damping force generating mechanism 42 is closed. In a normal speed region in which the piston speed is this predetermined value or more, the valve of the first damping force generating mechanism 42 and the valve of the second damping force generating mechanism 173 are both opened. The sub valve 171 is an extremely low speed valve which is opened to generate a damping force in a region in which the piston speed is extremely low.

That is, in the contraction stroke, the piston 18 moves to the lower chamber 20 side, and thus the pressure in the lower chamber 20 increases and the pressure in the upper chamber 19 decreases. However, since each of the first damping force generating mechanisms 41 and 42 and the second damping force generating mechanisms 173 and 183 does not have a fixed orifice, the oil liquid does not flow until the valve of the second damping force generating mechanism 173 is opened. Therefore, the damping force rises steeply. In a region in which the piston speed is higher than a third predetermined value at which the valve of the second damping force generating mechanism 173 is opened and in an extremely low speed region in which the piston speed is higher than the third predetermined value and lower than a fourth predetermined value, the valve of the second damping force generating mechanism 173 is opened in a state in which the valve of the first damping force generating mechanism 42 is closed.

That is, the sub valve 171 is separated from the outer valve seat portion 136, and the lower chamber 20 and the upper chamber 19 communicate with each other through the second passage 172 on a contraction side. Therefore, the oil liquid in the lower chamber 20 flows to the upper chamber 19 via the passage in the outer passage hole 143, the passage between the sub valve 171 and the outer valve seat portion 136, the cap chamber 146, the passages in the passage groove 153 and the large-diameter hole 152 of the passage forming member 102, the passage in the passage cutout portion 30 of the piston rod 21, the passage in the large-diameter hole portion 46 of the piston 18, the orifice 175, and the passage in the passage hole 37 of the piston 18. As a result, even in the extremely low speed region in which the piston speed is lower than the fourth predetermined value, the damping force of the valve characteristics (i.e., the characteristics in which the damping force is substantially proportional to the piston speed) can be obtained.

In the contraction stroke, in the normal speed region in which the piston speed is the fourth predetermined value or more, the valve of the first damping force generating mechanism 42 is opened while a state in which the valve of the second damping force generating mechanism 173 is opened remains. That is, the sub valve 171 is separated from the outer valve seat portion 136, and the oil liquid flows from the lower chamber 20 to the upper chamber 19 through the second passage 172 on a contraction side. At this time, in the second passage 172, the flow rate of the oil liquid is throttled by the orifice 175, and thus a differential pressure generated at the main valve 71 increases, the main valve 71 is separated from the valve seat portion 50, and the oil liquid flows from the lower chamber 20 to the upper chamber 19 through the first passage 72 on a contraction side. Therefore, the oil liquid in the lower chamber 20 flows to the upper chamber 19 via the passage in the passage hole 39 and the passage between the main valve 71 and the valve seat portion 50. As a result, even in the above normal speed region in which the piston speed is the fourth predetermined value or more, the damping force of the valve characteristics (i.e., the characteristics in which the damping force is substantially proportional to the piston speed) can be obtained. The rate of the increase of the damping force on the contraction side with respect to the increase of the piston speed in the normal speed region is lower than the rate of the increase of the damping force on the contraction side with respect to the increase of the piston speed in the extremely low speed region. In other words, the inclination of the rate of the increase of the damping force on the contraction side with respect to the increase in the piston speed in the normal speed region can be made lower than that in the extremely low speed region.

In the contraction stroke, in the normal speed region in which the piston speed is the fourth predetermined value or more, the differential pressure between the lower chamber 20 and the upper chamber 19 becomes larger than that in the low speed region. However, since the first passage 72 is not throttled by the orifice, it is possible to allow the oil liquid to flow via the first passage 72 at a large flow rate by the main valve 71 being opened. As a result, the flow rate of the oil liquid flowing through the sub valve 171 is reduced, and thus the valve rigidity of the sub valve 171 can be reduced. Therefore, the damping force in the normal speed region for the piston speed can be reduced, and the degree of freedom in design can be expanded.

In a case in which the piston speed is high, the differential pressure between the lower chamber 20 and the upper chamber 19 becomes large, but the second passage 172 is throttled with the orifice 175, and thus the pressure in the cap chamber 146 communicating with the upper chamber 19 via the orifice 175 becomes the pressure between the lower chamber 20 and the upper chamber 19. Therefore, it is possible to prevent the differential pressure between the lower chamber 20 and the upper chamber 19 from becoming too large. By this and by opening the main valve 71 to allow the oil liquid to flow at a large flow rate through the first passage 72, it is possible to prevent the sub valve 171 from being deformed.

The pressures in opposite directions from the lower chamber 20 and the cap chamber 146 are applied to the sub valve 181 in a closed state. At this time, the differential pressure between the lower chamber 20 and the upper chamber 19 is large, but the lower chamber 20 and the cap chamber 146 communicate with each other by the sub valve 171 being opened, and the orifice 175 is provided between the cap chamber 146 which becomes a downstream side of the sub valve 181 and the upper chamber 19. Therefore, it is possible to prevent the pressure in the cap chamber 146 from being reduced too much, and it is also possible to increase the pressure in the cap chamber 146 in accordance with the pressure increase in the lower chamber 20. Therefore, the differential pressure generated on surfaces of the sub valve 181 on the upstream side and downstream side is small, and it is possible to prevent a large back pressure from the lower chamber 20 side toward the cap chamber 146 side from being applied to the sub valve 181.

The above shock absorber 1 is provided with, as a flow path through which the oil liquid flows from the lower chamber 20 to the upper chamber 19 in the contraction stroke, the first passage 72 and the second passage 172 in parallel and is provided with the main valve 71 and the sub valve 171 in parallel. The orifice 175 is connected in series with the sub valve 171 in the second passage 172.

In the contraction stroke, the damping force characteristics by the damping valve mechanism 197 are also combined.

In the extension stroke, in the normal speed region in which the piston speed is the second predetermined value or more, the differential pressure between the upper chamber 19 and the lower chamber 20 becomes large, but, since the pressure increase in the cap chamber 146 can be suppressed with the orifice 175 formed on the upstream side from the sub valve 171, the deformation of the sub valve 171 due to the back pressure can be suppressed. In the contraction stroke, in the normal speed region in which the piston speed is the fourth predetermined value or more, the differential pressure between the lower chamber 20 and the upper chamber 19 becomes larger than that in the low speed region, but by allowing the oil liquid to flow at a large flow rate in the first passage 72 and by throttling the downstream side from the sub valve 171 in the second passage 172 with the orifice 175, it is possible to suppress the deformation of the sub valve 171. Therefore, the durability of the sub valve 171 can be improved.

In the extension stroke, in the normal speed region in which the piston speed is the second predetermined value or more, the differential pressure between the upper chamber 19 and the lower chamber 20 becomes larger than that in the low speed region, but by allowing the oil liquid to flow at a large flow rate in the first passage 92 and by throttling the second passage 182 with the orifice 175, it is possible to suppress the deformation of the sub valve 181. In the contraction stroke, in the normal speed region in which the piston speed is the fourth predetermined value or more, the differential pressure between the lower chamber 20 and the upper chamber 19 becomes large, but the lower chamber 20 and the cap chamber 146 communicate with each other by the sub valve 171 being opened, and the flow of the oil liquid from the cap chamber 146 to the upper chamber 19 is throttled with the orifice 175 provided between the cap chamber 146 and the upper chamber 19. Therefore, the differential pressure between the lower chamber 20 and the cap chamber 146 is small, and deformation of the sub valve 181 due to the back pressure can be suppressed. Therefore, the durability of the sub valve 181 can be improved.

Since the second damping force generating mechanisms 173 and 183 which are independent in the contraction stroke and the extension stroke are provided, the degree of freedom in setting the damping force characteristics is increased.

In Patent Document 1 described above, a shock absorber in which two oil chambers are connected by parallel flow paths, and a valve is provided in each of these flow paths, and thus the valves which are opened in the same stroke are disposed in parallel is described. By employing a structure in which the valves which are opened in the same stroke are disposed in parallel in this way, it is possible to open one valve rather than another valve in a region in which the piston speed is low and to open both valves in a region in which the piston speed is higher than that in the region in which the piston speed is low. In such a structure, it is required to improve the durability of the valve on the low speed side in particular.

On the other hand, in the shock absorber 1 of the first embodiment, the sub valve 181 and the sub valve 171 of the second damping force generating mechanisms 173 and 183 of the second passages 172 and 182 which are parallel to the first passages 72 and 92 of the piston 18 provided with the first damping force generating mechanisms 41 and 42 are provided in the valve seat member 106 disposed in the lower chamber 20. At the same time, the bottomed tubular cap member 101 is provided between the piston 18 and the valve seat member 106 in the second passages 172 and 182, and the valve seat member 106 is disposed inside the cap member 101. At this time, the sub valve 181 is provided on the lower chamber 20 side, and the sub valve 171 is provided in the cap chamber 146 formed between the bottom portion 122 of the cap member 101 and the valve seat member 106. Further, the orifice 175 is disposed on the upstream side from the sub valve 181 of the second passage 172 in flow during the extension stroke in which the sub valve 181 is opened. As a result, during the contraction stroke, the sub valve 171 is opened with respect to the lower chamber 20, the oil liquid flows into the cap chamber 146, and the orifice 175 throttles the flow of the oil liquid flowing to the upper chamber 19. Therefore, the differential pressure between the cap chamber 146 and the lower chamber 20 becomes small, the sub valve 181 in a closed state which receives the back pressure from the lower chamber 20 receives the same pressure as that of the lower chamber 20 from the cap chamber 146, and the received back pressure (the differential pressure) is suppressed. Therefore, the durability of the sub valve 181 can be improved.

Each of the second passages 172 and 182 is not a constantly communicating passage and does not have a constantly communicating fixed orifice. Therefore, the effect of suppressing the back pressure received by the sub valve 181 is high.

Since the present embodiment has a structure in which the piston rod 21 is inserted into the piston 18, the cap member 101, and the valve seat member 106, it is possible to compactly dispose the piston 18, the cap member 101, and the valve seat member 106.

Since the orifice 175 is formed by being cut out of a disk 82 in the first damping force generating mechanism 41 on an extension side, the disc 82 which is in contact with the piston 18, the orifice 175 can be easily formed.

Since a part of each of the second passages 172 and 182 is formed by being cut out of the piston rod 21, the second passages 172 and 182 can be easily formed.

Since the sub valve 171, which is an inflow valve into the cap chamber 146, has a valve opening pressure lower than that of the sub valve 181, the sub valve 171 is opened with respect to the lower chamber 20 during the contraction stroke, and the oil liquid easily flows into the cap chamber 146. Therefore, in a state in which the pressure in the lower chamber 20 is lower, the sub valve 181 in a closed state receives the same pressure as that of the lower chamber 20 from the cap chamber 146, and the received back pressure is suppressed. Therefore, the durability of the sub valve 181 can be further improved.

Since the differential pressure between the cap chamber 146 and the lower chamber 20 does not increase in both the expansion stroke and the contraction stroke, it is possible to use a thin pressed part as the cap member 101. Therefore, it is advantageous in terms of manufacturability and weight reduction.

Second Embodiment

Next, a second embodiment will be described mainly based on FIG. 6, focusing on portions different from the first embodiment. The portions common to the first embodiment are represented by the same terms and the same reference signs.

Figure 6:
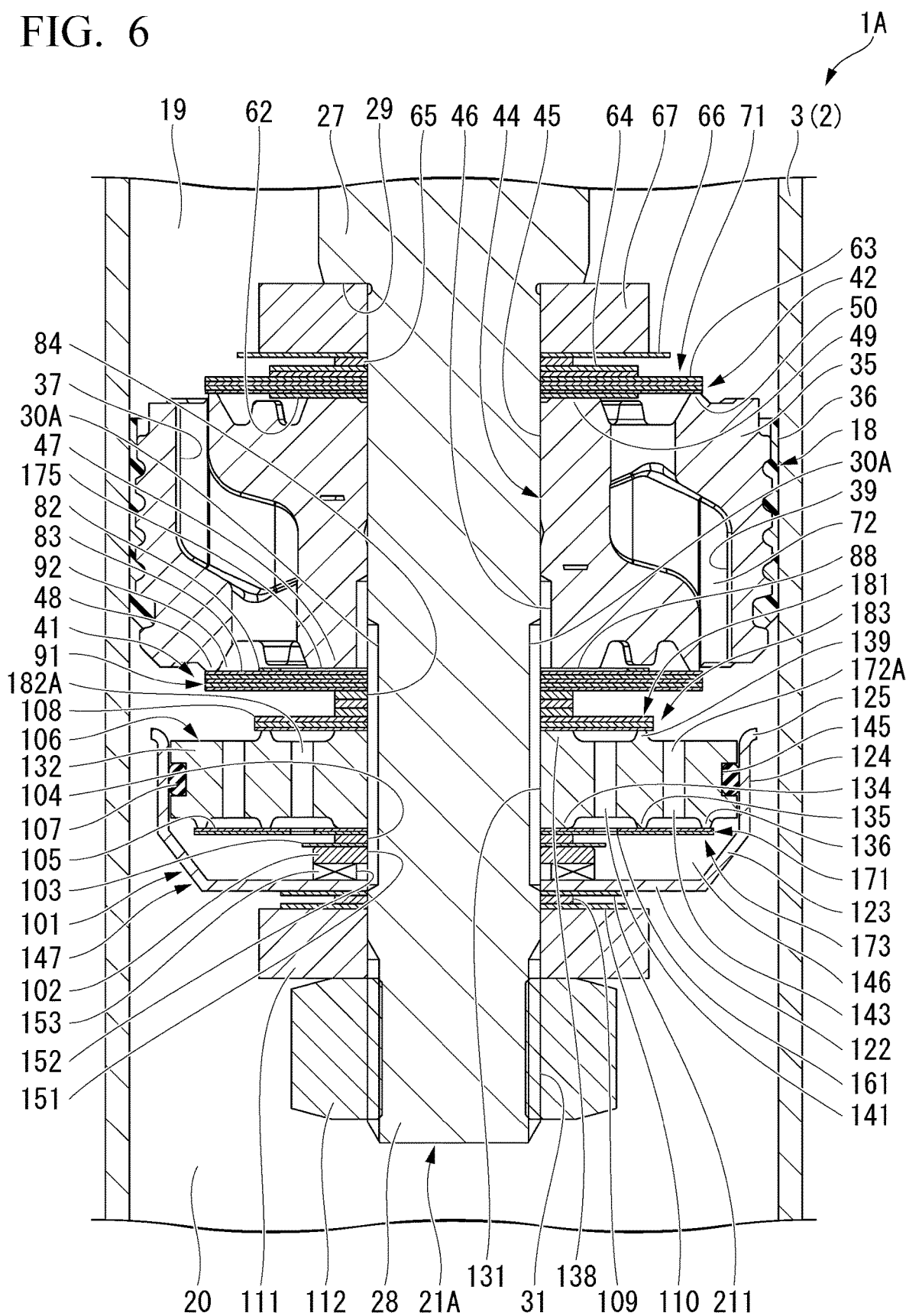
FIG. 6 is a cross-sectional view showing a main part of a shock absorber according to a second embodiment of the present invention.

In a shock absorber 1A of the second embodiment, as shown in FIG. 6, the housing 147 constituted by the cap member 101, the valve seat member 106, and the O-ring 107; the passage forming member 102, the disk 103, the disk 104, and the sub valve 171 on a contraction side which are provided in the housing 147; and the sub valve 181 on an extension side opposite to the sub valve 171 of the valve seat member 106, which are similar to those of the first embodiment, are provided with an orientation in the axial direction opposite to that of the first embodiment.

On a side of the main valve 91 on an extension side, which is similar to that of the first embodiment, opposite to the piston 18, the disk 85 of the first embodiment is not provided, and the plurality (specifically, three) of disks 84, which are similar to those of the first embodiment, are provided. The sub valve 181 constituted by the plurality (specifically, three) of disks 108 is superposed on a side of these disks 84 opposite to the main valve 91. The valve seat member 106 is superposed on a side of the sub valve 181 opposite to the disks 84, with the inner seat portion 138 and the valve seat portion 139 facing the sub-valve 181 side.

Further, the sub valve 171 on a contraction side which is constituted by the plurality (specifically, two) of disks 105 is superposed on the inner seat portion 134, the intermediate valve seat portion 135, and the outer valve seat portion 136 of the valve seat member 106 which face a side opposite to the sub valve 181. The disk 104, the disk 103, and the passage forming member 102 are superposed on the sub valve 171 in that order. The passage forming member 102 is oriented such that the small-diameter fitting hole 151 faces the disk 103 side.

Further, the valve seat member 106, the sub valve 171, the disk 104, the disk 103, and the passage forming member 102 are sheathed with the cap member 101 to be covered therewith such that the bottom portion 122 is brought into contact with the large-diameter hole 152 and the passage groove 153 side of the passage forming member 102 and the tubular portion 124 is fitted to the main body portion 132 and the O-ring 107 of the valve seat member 106.

On a side of the bottom portion 122 of the cap member 101 opposite to the passage forming member 102, one disk 211, one disk 109 which is similar to that of the first embodiment, and the disk 110 and the annular member 111 both of which are similar to those of the first embodiment are superposed. The nut 112 is provided on a side of the annular member 111 opposite to the disk 110 by being screwed to the male screw 31. The disk 211 is made of a metal. The disk 211 has a perforated circular flat plate shape having a constant thickness into which the attachment shaft portion 28 of the piston rod 21 can be fitted. The disk 211 has an outer diameter which is the same as the outer diameter of the disk 110.

In the second embodiment, the distance from the piston 18 to the passage forming member 102 in the axial direction is longer than that of the first embodiment due to the above disposition. Therefore, in accordance with this, in a piston rod 21A of the second embodiment, a passage cutout portion 30A which is longer in the axial direction than the passage cutout portion 30 of the piston rod 21 of the first embodiment is formed. The passage in the passage cutout portion 30A communicates with the passage in the large-diameter hole 152 of the passage forming member 102.

In such a second embodiment, in the contraction stroke, the oil liquid flows from the lower chamber 20 to the upper chamber 19 via the passage in the outer passage hole 143, the passage between the sub valve 171 which is opened and the outer valve seat portion 136, the cap chamber 146, the passages in the passage groove 153 and the large-diameter hole 152 of the passage forming member 102, the passage in the passage cutout portion 30A of the piston rod 21A, the passage in the large-diameter hole portion 46 of the piston 18, the orifice 175 constituted by the passage in the cutout portion 88 of the disk 82, and the passage in the passage hole 37. These constitute a second passage 172A on a contraction side.

In the extension stroke, the oil liquid flows from the upper chamber 19 to the lower chamber 20 via the passage in the passage hole 37 of the piston 18, the orifice 175 constituted by the passage in the cutout portion 88 of the disk 82, the passage in the large-diameter hole portion 46 of the piston 18, the passage in the passage cutout portion 30A of the piston rod 21A, the passages in the large-diameter hole 152 and the passage groove 153 of the passage forming member 102, the cap chamber 146, the passage in the through hole 161 of the disk 105, the passage in the inner passage hole 141, and the passage between the sub valve 181 which is opened and the valve seat portion 139. These constitute a second passage 182A on an extension side.

Such a shock absorber 1A of the second embodiment has a hydraulic circuit, an operation, and damping force characteristics which are similar to those of the shock absorber 1 of the first embodiment.

Third Embodiment

Next, a third embodiment will be described mainly based on FIG. 7, focusing on portions different from the first embodiment. The portions common to the first embodiment are represented by the same terms and the same reference signs.

Figure 7:
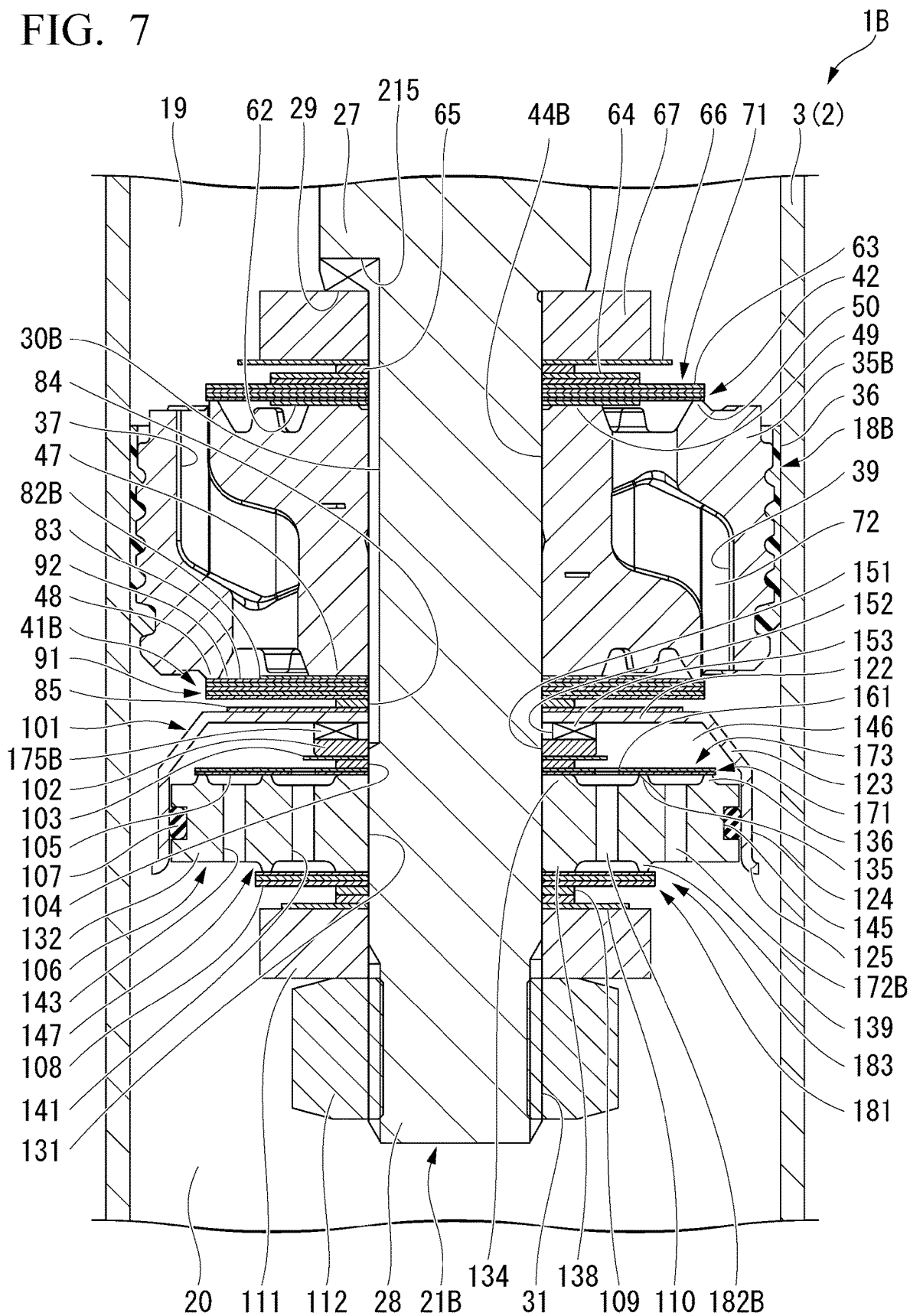
FIG. 7 is a cross-sectional view showing a main part of a shock absorber according to a third embodiment of the present invention.

As shown in FIG. 7, a shock absorber 1B of the third embodiment has a piston rod 21B which is partially different in configuration from the piston rod 21. In the piston rod 21B, a passage cutout portion 30B extending to the shaft step portion 29 is formed instead of the passage cutout portion 30. A groove portion 215 extending in the radial direction and communicating with the passage cutout portion 30B is formed in the shaft step portion 29 of the main shaft portion 27 of the piston rod 21B. The passage in the passage cutout portion 30B communicates with the passage in the large-diameter hole 152 of the passage forming member 102. As a result, the passages in the large-diameter hole 152 and the passage groove 153 of the passage forming member 102 constantly communicate with the upper chamber 19 via the passage in the passage cutout portion 30B and the passage in the groove portion 215.

The third embodiment has a piston 18B which is partially different in configuration from the piston 18. The piston 18B includes a piston main body 35B which is partially different in configuration from the piston main body 35. In the piston main body 35B, an insertion hole 44B having the same diameter as the small-diameter hole portion 45 is formed instead of the insertion hole 44 having the small-diameter hole portion 45 and the large-diameter hole portion 46 of the first embodiment.

Further, the third embodiment has a first damping force generating mechanism 41B on an extension side which is partially different in configuration from the first damping force generating mechanism 41 of the first embodiment. The first damping force generating mechanism 41B has a disk 82B in which the cutout portion 88 is not formed, instead of the disk 82 of the first embodiment in which the cutout portion 88 is formed.

In such a third embodiment, in the contraction stroke, the oil liquid flows from the lower chamber 20 to the upper chamber 19 via the passage in the outer passage hole 143, the passage between the sub valve 171 which is opened and the outer valve seat portion 136, the cap chamber 146, the passages in the passage groove 153 and the large-diameter hole 152 of the passage forming member 102, and the passages in the passage cutout portion 30B and the groove portion 215 of the piston rod 21B. These constitute a second passage 172B on a contraction side.

In the second passage 172B, the passage in the passage groove 153 of the passage forming member 102 becomes an orifice 175B which is the narrowest among portions in which a flow path cross-sectional area is fixed. The orifice 175B is disposed on a downstream side from the sub valve 171 in the flow of the oil liquid when the oil liquid flows through the second passage 172B and the sub valve 171 is opened.

In the extension stroke, the oil liquid flows from the upper chamber 19 to the lower chamber 20 via the passages in the groove portion 215 and the passage cutout portion 30B of the piston rod 21B, the passage in the large-diameter hole 152 and the passage groove 153 of the passage forming member 102, the cap chamber 146, the passage in the through hole 161 of the sub valve 171, the passage in the inner passage hole 141, and the passage between the sub valve 181 which is opened and the valve seat portion 139. These constitute a second passage 182B on an extension side.

Also in the second passage 182B, the passage in the passage groove 153 of the passage forming member 102 becomes an orifice 175B which is the narrowest among portions in which a flow path cross-sectional area is fixed. The orifice 175B is disposed on an upstream side from the sub valve 181 in the flow of the oil liquid when the oil liquid flows through the second passage 182B and the sub valve 181 is opened.

Such a shock absorber 1B of the third embodiment has a hydraulic circuit, an operation, and damping force characteristics which are similar to those of the shock absorber 1 of the first embodiment.

Fourth Embodiment

Next, a fourth embodiment will be described mainly based on FIG. 8, focusing on portions different from the first embodiment. The portions common to the first embodiment are represented by the same terms and the same reference signs.

Figure 8:
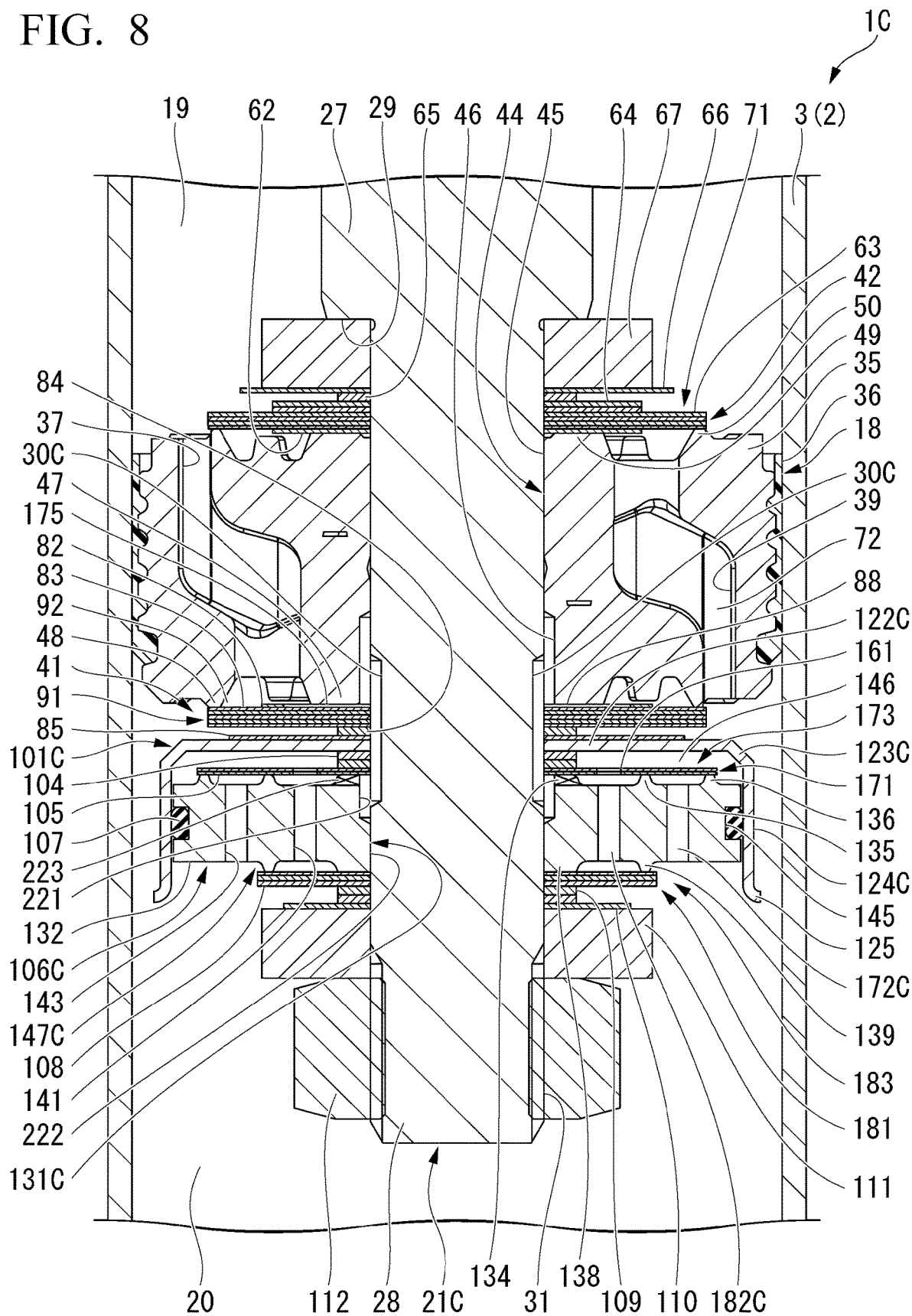
FIG. 8 is a cross-sectional view showing a main part of a shock absorber according to a fourth embodiment of the present invention.

In a shock absorber 1C of the fourth embodiment, as shown in FIG. 8, the passage forming member 102 and the disk 103 of the first embodiment are not provided. Further, the shock absorber 1C of the fourth embodiment has a housing 147C which is partially different in configuration from the housing 147. The housing 147C includes a valve seat member 106C which is partially different in configuration from the valve seat member 106 and a cap member 101C which is partially different in configuration from the cap member 101.

The valve seat member 106C is provided with a through hole 131C in the center of the main body portion 132 in the radial direction. The through hole 131C is constituted by a large-diameter hole portion 221 on the inner seat portion 134 side in the axial direction and a small-diameter hole portion 222 on the inner seat portion 138 side in the axial direction. The large-diameter hole portion 221 has a larger diameter than that of the small-diameter hole portion 222. The valve seat member 106C is fitted to the attachment shaft portion 28 in the small-diameter hole portion 222. In the valve seat member 106C, a plurality of passage cutout portions 223 that penetrate the inner seat portion 134 in the radial direction are formed at equal intervals in the circumferential direction.

To communicate with the passage in the large-diameter hole portion 221 of the valve seat member 106C, in a piston rod 21C of the fourth embodiment, a passage cutout portion 30C has a length in the piston rod 21C in the axial direction longer than that in the piston rod 21 of the first embodiment.

The cap member 101C of the fourth embodiment has a bottom portion 122C having an outer diameter larger than the outer diameter of the bottom portion 122 of the first embodiment, an intermediate tapered portion 123C having an axial length and a radial width shorter than the intermediate tapered portion 123 of the first embodiment, and a tubular portion 124C having an axial length longer than that of the tubular portion 124. In the cap member 101C, the bottom portion 122C restricts the deformation of the sub valve 171 on a contraction side in the opening direction beyond a specified value.

In the fourth embodiment, a plurality (specifically, two) of disks 104 are provided. The disk 104 is in contact with the bottom portion 122C of the cap member 101C.

In such a fourth embodiment, in the contraction stroke, the oil liquid flows from the lower chamber 20 to the upper chamber 19 via the passage in the outer passage hole 143, the passage between the sub valve 171 which is opened and the outer valve seat portion 136, the cap chamber 146, the passage in the through hole 161 of the sub valve 171, the passages in the passage cutout portion 223 and the large-diameter hole portion 221 of the valve seat member 106C, the passage in the passage cutout portion 30C of the piston rod 21C, the passage in the large-diameter hole portion 46 of the piston 18, the orifice 175 constituted by the passage in the cutout portion 88 of the disk 82, and the passage in the passage hole 37. These constitute a second passage 172C on a contraction side.

In the extension stroke, the oil liquid flows from the upper chamber 19 to the lower chamber 20 via the passage in the passage hole 37 of the piston 18, the orifice 175 constituted by the passage in the cutout portion 88 of the disk 82, the passage in the large-diameter hole portion 46 of the piston 18, the passage in the passage cutout portion 30C of the piston rod 21C, the passages in the large-diameter hole portion 221 and the passage cutout portion 223 of the valve seat member 106C, the passage in the inner passage hole 141, and the passage between the sub valve 181 which is opened and the valve seat portion 139. These constitute a second passage 182C on an extension side. The passage in the passage cutout portion 223 constantly communicates with the passage in the through hole 161 of the disk 105.

Such a shock absorber 1C of the fourth embodiment has a hydraulic circuit, an operation, and damping force characteristics which are similar to those of the shock absorber 1 of the first embodiment.

Fifth Embodiment

Next, a fifth embodiment will be described mainly based on FIGS. 9 and 10, focusing on portions different from the third and fourth embodiments. The portions common to the third and fourth embodiments are represented by the same terms and the same reference signs.

Figure 9:
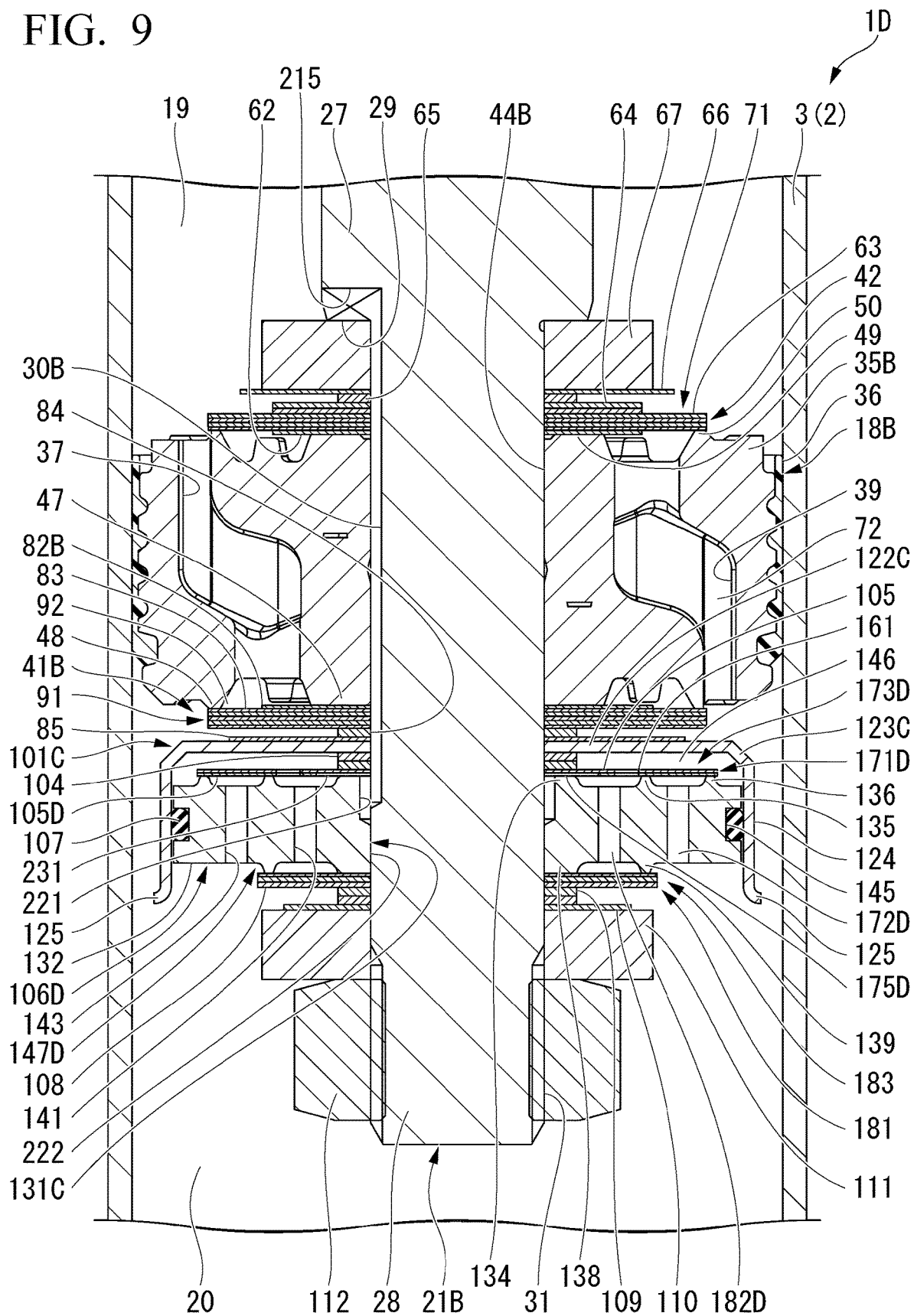
FIG. 9 is a cross-sectional view showing a main part of a shock absorber according to a fifth embodiment of the present invention.
Figure 10:
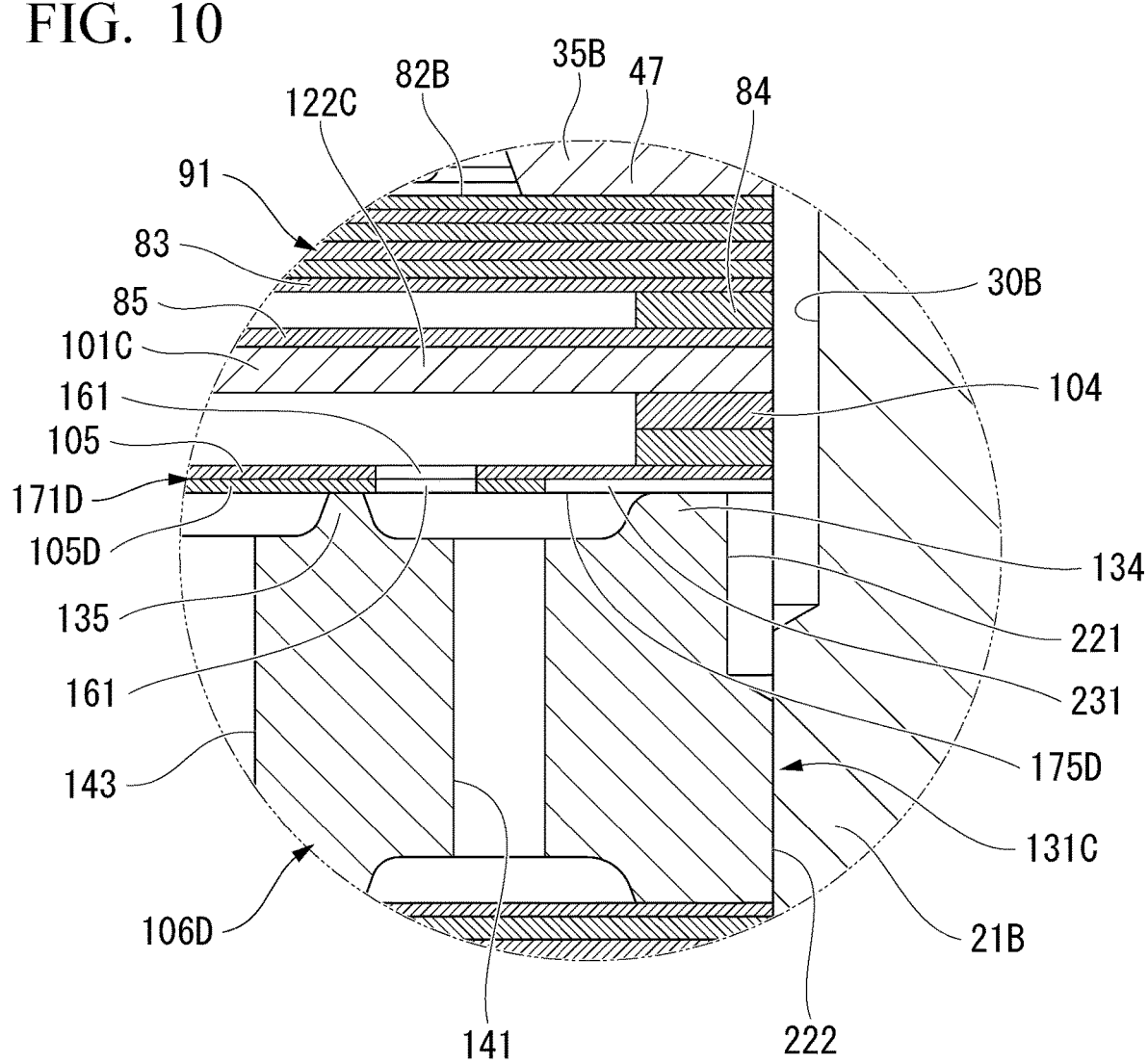
FIG. 10 is a partial cross-sectional view showing the periphery of an orifice of the shock absorber according to the fifth embodiment of the present invention.

In a shock absorber 1D of the fifth embodiment, as shown in FIG. 9, the first damping force generating mechanism 41B including a disk 82B, the piston 18B, and the piston rod 21B, which are similar to those of the third embodiment, and the cap member 101C and the plurality (specifically, two) of disks 104, which are similar to those of the fourth embodiment, are provided.

The fifth embodiment has a housing 147D which is partially different in configuration from the housing 147C. The housing 147D includes a valve seat member 106D which is different from the valve seat member 106C in that the passage cutout portion 223 is not formed.

Further, the shock absorber 1D of the fifth embodiment has a second damping force generating mechanism 173D which is partially different in configuration from the second damping force generating mechanism 173. The second damping force generating mechanism 173D includes a sub valve 171D in which the disk 105D in contact with the valve seat member 106D is partially different in configuration from the disk 105 of the sub valve 171. As shown in FIG. 10, in the disk 105D, a cutout portion 231 extending from the inner side in the radial direction with respect to the through hole 161 to the inner peripheral edge portion is formed. The passage in the cutout portion 231 allows the passage in the passage cutout portion 30B of the piston rod 21B and the passage in the large-diameter hole portion 221 of the valve seat member 106D to constantly communicate with the passage in the inner passage hole 141.

In such a fifth embodiment, in the contraction stroke, the oil liquid flows from the lower chamber 20 to the upper chamber 19 via the passage in the outer passage hole 143, the passage between the sub valve 171D which is opened and the outer valve seat portion 136, the cap chamber 146, the passage in the through hole 161 of the sub valve 171D, the passage in the cutout portion 231 of the disk 105D, the passage in the large-diameter hole portion 221 of the valve seat member 106D, and the passage in the passage cutout portion 30B of the piston rod 21B, as shown in FIG. 9. These constitute a second passage 172D on a contraction side.

In the second passage 172D, the passage in the cutout portion 231 of the disk 105 becomes an orifice 175D which is the narrowest among portions in which a flow path cross-sectional area is fixed. The orifice 175D is disposed on a downstream side from the sub valve 171D in the flow of the oil liquid when the oil liquid flows through the second passage 172D and the sub valve 171D is opened.

In the extension stroke, the oil liquid flows from the upper chamber 19 to the lower chamber 20 via the passage in the passage cutout portion 30B of the piston rod 21B, the passage in the large-diameter hole portion 221 of the valve seat member 106C, the passages in the cutout portion 231 of the disk 105D, the passage in the inner passage hole 141 of the valve seat member 106C, and the passage between the sub valve 181 which is opened and the valve seat portion 139. These constitute a second passage 182D on an extension side.

In the second passage 182D, the passage in the cutout portion 231 of the disk 105 becomes an orifice 175D which is the narrowest among portions in which a flow path cross-sectional area is fixed. The orifice 175D is disposed on an upstream side from the sub valve 181 in the flow of the oil liquid when the oil liquid flows through the second passage 182D and the sub valve 181 is opened.

Such a shock absorber 1D of the fifth embodiment has a hydraulic circuit, an operation, and damping force characteristics which are similar to those of the shock absorber 1 of the first embodiment.

Sixth Embodiment

Next, a sixth embodiment will be described mainly based on FIGS. 11 and 12, focusing on portions different from the fourth embodiment. The portions common to the fourth embodiment are represented by the same terms and the same reference signs.

Figure 11:
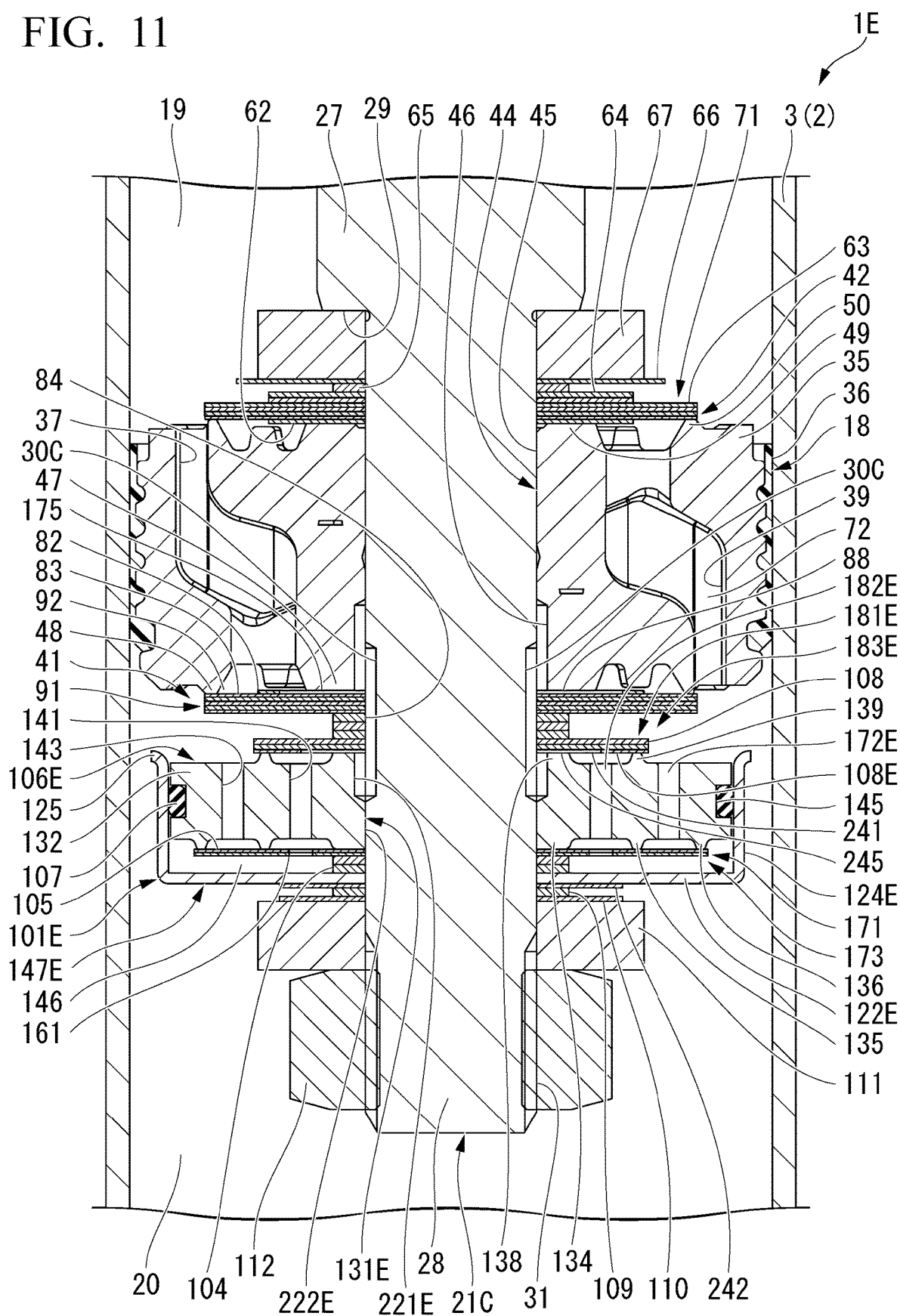
FIG. 11 is a cross-sectional view showing a main part of a shock absorber according to a sixth embodiment of the present invention.
Figure 12:
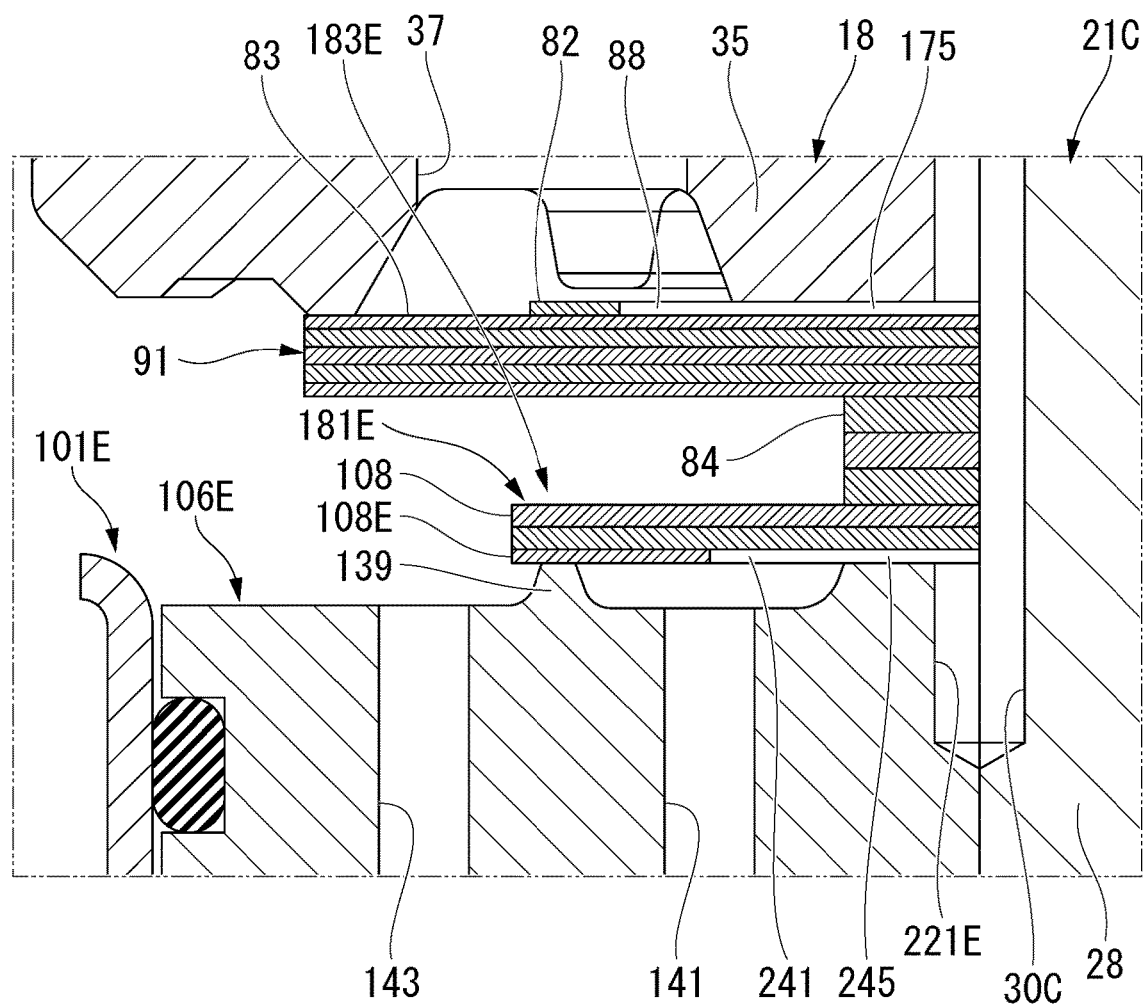
FIG. 12 is a partial cross-sectional view showing the periphery of an orifice of the shock absorber according to the sixth embodiment of the present invention.

As shown in FIG. 11, a shock absorber 1E of the sixth embodiment has a cap member 101E which is partially different in configuration from the cap member 101C. The cap member 101E does not have the intermediate tapered portion 123C of the fourth embodiment and has a bottom portion 122E having an outer diameter larger than that of the bottom portion 122C and a tubular portion 124E having an axial length longer than that of the tubular portion 124C.

The shock absorber 1E has a valve seat member 106E which is partially different in configuration from the valve seat member 106C of the fourth embodiment. The passage cutout portion 223 is not formed in the valve seat member 106E. The valve seat member 106E has a through hole 131E in the center in the radial direction. In the through hole 131E, a large-diameter hole portion 221E is formed on the inner seat portion 138 and the valve seat portion 139 side in the axial direction, and a small-diameter hole portion 222E which has a diameter smaller than that of the large-diameter hole portion 221E and is fitted to the attachment shaft portion 28 is formed on the inner seat portion 134, the intermediate valve seat portion 135, and the outer valve seat portion 136 side in the axial direction.

Similar to the fourth embodiment, the plurality (specifically, two) of disks 104 and the sub valve 171 on a contraction side are provided inside a housing 147E constituted by the cap member 101E, the valve seat member 106E, and the O-ring 107. The sub valve 171 is in contact with the inner seat portion 134, the intermediate valve seat portion 135, and the outer valve seat portion 136 of the valve seat member 106E. The plurality of disks 104 are provided between the sub valve 171 and the bottom portion 122E of the cap member 101E.

The housing 147E, the sub valve 171 on a contraction side and the plurality of disks 104 are provided with an orientation in the axial direction opposite to that of the fourth embodiment.

The shock absorber 1E has a second damping force generating mechanism 183E on an extension side which is partially different in configuration from the second damping force generating mechanism 183. The second damping force generating mechanism 183E includes a sub valve 181E. In the sub valve 181E, the disk 108E in contact with the inner seat portion 138 and the valve seat portion 139 of the valve seat member 106E is partially different in configuration from the disk 108 of the sub valve 181 of the fourth embodiment. In the disk 108E, as shown in FIG. 12, a cutout portion 241 extending from an intermediate position on the inner side in the radial direction with respect to the valve seat portion 139 to the inner peripheral edge portion is formed.

As shown in FIG. 11, the sub valve 181E is also provided with an orientation in the axial direction opposite to that of the fourth embodiment, similarly to the valve seat member 106E. That is, the plurality (specifically, three) of disks 84 and the sub valve 181E are superposed on the main valve 91 on an extension side in that order. At that time, in the sub valve 181E, the plurality (specifically, two) of disks 108 are disposed on the disk 84 side in the axial direction, and one disk 108E is disposed on a side opposite to the disk 84 in the axial direction. Further, on the side of the sub-valve 181E opposite to the disk 84 in the axial direction, the valve seat member 106E with the O-ring 107 mounted, the sub valve 171, and the plurality of disks 104 are superposed in that order, and the valve seat member 106E, the sub valve 171, and a plurality of disks 104 are sheathed with the cap member 101E to be covered therewith.

The cutout portion 241 of the disk 108E of the sub valve 181E is formed in a range on the inner side in the radial direction with respect to the valve seat portion 139. The passage in the cutout portion 241 allows the passage in the passage cutout portion 30C of the piston rod 21C and the passage in the large-diameter hole portion 221E of the valve seat member 106E to communicate with the passage between the sub valve 181E and the valve seat portion 139.

The passage in the cutout portion 241 communicates with the cap chamber 146 via the passage in the inner passage hole 141 and the through hole 161 of the sub valve 171.

On a side of the bottom portion 122E of the cap member 101E opposite to the disk 104, one disk 242, one disk 109, one disk 110, and the annular member 111 are superposed. The disk 242 is made of a metal. The disk 242 has a perforated circular flat plate shape having a constant thickness into which the attachment shaft portion 28 of the piston rod 21 can be fitted. The disk 242 has an outer diameter which is the same as the outer diameter of the disk 110.

In such a sixth embodiment, in the contraction stroke, when the sub valve 171 is separated from the outer valve seat portion 136, the oil liquid flows from the lower chamber 20 to the upper chamber 19 via the passage in the outer passage hole 143, the passage between the sub valve 171 which is opened and the outer valve seat portion 136, the cap chamber 146, the passage in the through hole 161 of the sub valve 171, the passage in the inner passage hole 141 of the valve seat member 106E, the passage in the cutout portion 241 of the disk 108E, the passage in the large-diameter hole portion 221E of the valve seat member 106E, the passage in the passage cutout portion 30C of the piston rod 21C, the passage in the cutout portion 88 of the disk 82, and the passage in the passage hole 37 of the piston 18. These constitute a second passage 172E on a contraction side.

At this time, in addition to the passage in the cutout portion 88 of the disk 82 becoming the orifice 175, the passage in the cutout portion 241 of the disk 108E becomes an orifice 245. The orifice 175 and the orifice 245 are disposed in series on a downstream side from the sub valve 171 in the flow of the oil liquid when the oil liquid flows through the second passage 172E and the sub valve 171 is opened.

In the extension stroke, the oil liquid flows from the upper chamber 19 to the lower chamber 20 via the passage in the passage hole 37 of the piston 18, the passage in the cutout portion 88 of the disk 82, the passage in the large-diameter hole portion 46 of the piston 18, the passage in the passage cutout portion 30C of the piston rod 21C, the passage in the large-diameter hole portion 221E of the valve seat member 106E, the passage in the cutout portion 241 of the disk 108E, and the passage between the sub valve 181E and the valve seat portion 139. These constitute a second passage 182E on an extension side.

Also at this time, in addition to the passage in the cutout portion 88 of the disk 82 becoming the orifice 175, the passage in the cutout portion 241 of the disk 108E becomes an orifice 245. The orifice 175 and the orifice 245 are disposed in series on an upstream side from the sub valve 181E in the flow of the oil liquid when the oil liquid flows through the second passage 182E and the sub valve 181E is opened.

In the shock absorber 1E of the sixth embodiment, the degree of freedom in setting the orifice is increased by the two orifices of the orifice 175 and the orifice 245 in series.

Seventh Embodiment

Next, a seventh embodiment will be described mainly based on FIG. 13, focusing on portions different from the third embodiment. The portions common to the third embodiment are represented by the same terms and the same reference signs.

Figure 13:
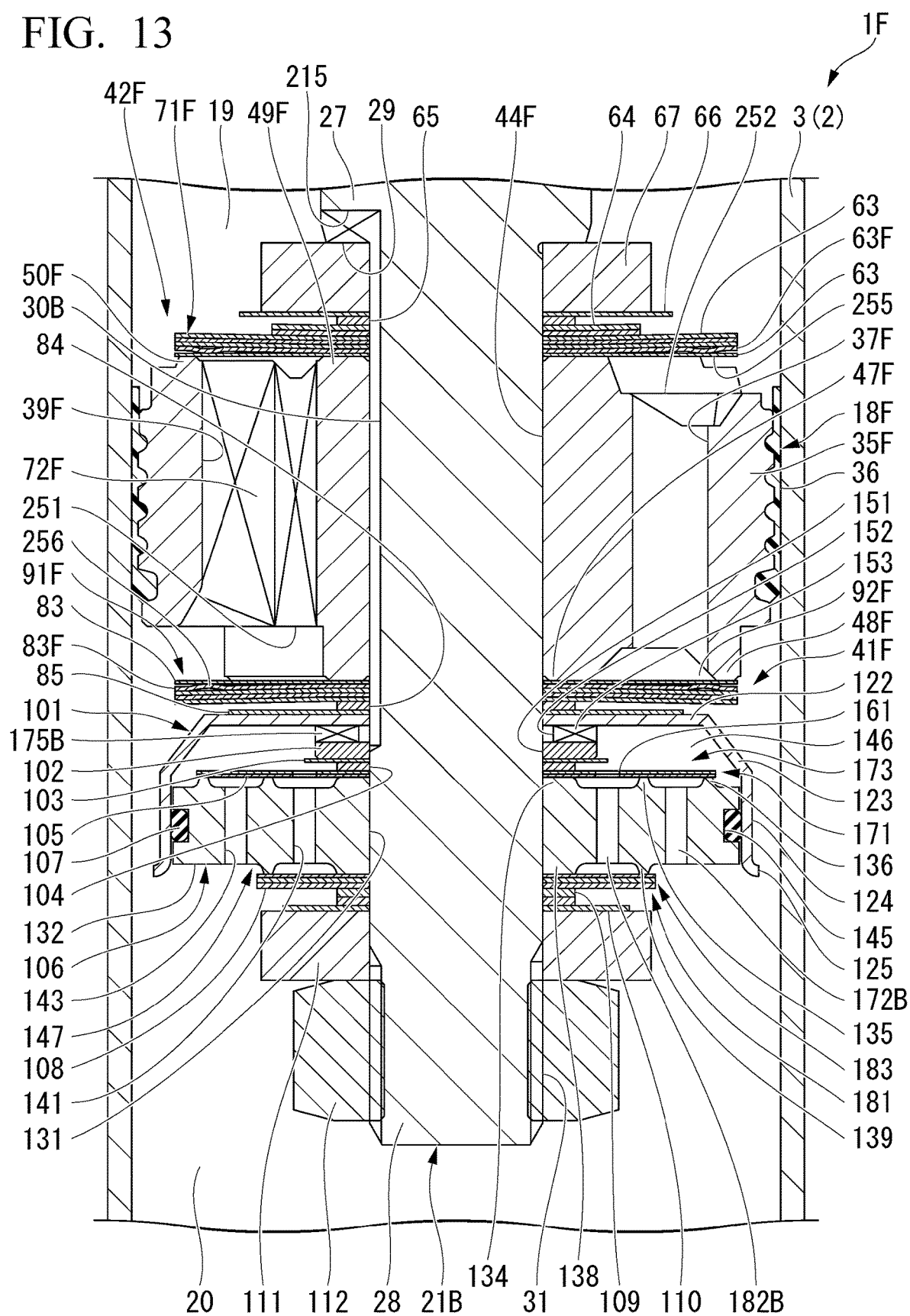
FIG. 13 is a cross-sectional view showing a main part of a shock absorber according to a seventh embodiment of the present invention.

As shown in FIG. 13, a shock absorber 1F of the seventh embodiment has a piston 18F which is partially different in configuration from the piston 18B of the third embodiment. In the piston 18F, a piston main body 35F is different from the piston main body 35B.

In the center of the piston main body 35F in the radial direction, an insertion hole 44F is formed to penetrate the piston main body 35F in the axial direction. The attachment shaft portion 28 of the piston rod 21 is fitted to the insertion hole 44F. The piston main body 35F is provided with a plurality of passage holes 37F (only one is shown in FIG. 13 due to the cross section) through which the upper chamber 19 and the lower chamber 20 can communicate with each other and a plurality of passage holes 39F (only one is shown in FIG. 13 due to the cross section) through which the upper chamber 19 and the lower chamber 20 can communicate with each other. The piston main body 35F is a sintered product. In the piston main body 35F, the passage holes 37F and 39F are formed at the time of sintering or by being cut with a drill.

The plurality of passage holes 37F are parallel to the piston main body 35F in the axial direction. The plurality of passage holes 39F are also parallel to the piston main body 35F in the axial direction.

In the end portion of the piston main body 35F on the lower chamber 20 side in the axial direction, on the inner side of the piston main body 35F in the radial direction with respect to an opening of the passage hole 37F on the lower chamber 20 side, an annular inner seat portion 47F is formed. In the end portion of the piston main body 35F on the lower chamber 20 side in the axial direction, a valve seat portion 48F which surrounds the opening of each of the passage holes 37F on the lower chamber 20 side in an annular shape with the inner seat portion 47F is formed.

In the end portion of the piston main body 35F on the upper chamber 19 side in the axial direction, on the inner side of the piston main body 35F in the radial direction with respect to an opening of the passage hole 39F on the upper chamber 19 side, an annular inner seat portion 49F is formed. In the end portion of the piston main body 35F on the upper chamber 19 side in the axial direction, a valve seat portion 50F which surrounds the opening of each of the passage holes 39F on the upper chamber 19 side in an annular shape with the inner seat portion 49F is formed.

In the end portion of the piston main body 35F on the lower chamber 20 side in the axial direction, a step portion 251 is formed by being cut out of the piston main body 35F at an opening position of each of the passage holes 39F in the circumferential direction such that the step portion 251 is located on the inner side in the axial direction with respect to the inner seat portion 47F. The step portion 251 allows the passage hole 39F which is aligned with the step portion 251 to constantly communicate with the lower chamber 20. In the end portion of the piston main body 35F on the upper chamber 19 side in the axial direction, a step portion 252 is formed by being cut out of the piston main body 35F at an opening position of each of the passage holes 37F in the circumferential direction such that the step portion 252 is located on the inner side in the axial direction with respect to the inner seat portion 49F. The step portion 252 allows the passage hole 37F which is aligned with the step portion 252 to constantly communicate with the upper chamber 19.

In the seventh embodiment, a main valve 71F on a contraction side which is partially different in configuration from the main valve 71 is provided. The main valve 71F is provided with a disk 63F at a predetermined intermediate position in a stacking direction of the plurality of disks 63. A projection 255 that projects on one side in the axial direction is formed on the outer side of the disk 63F in the radial direction. The projection 255 projects toward the valve seat portion 50F. The projection 255 presses the outer peripheral side of one disk 63, which is closer to the valve seat portion 50F than the disk 63F, against the valve seat portion 50F. The main valve 71F is constantly in contact with the inner seat portion 49F and is separated from or seated on the valve seat portion 50F. The main valve 71F and the valve seat portion 50F constitute a first damping force generating mechanism 42F on a contraction side.

In the seventh embodiment, a main valve 91F on an extension side which is partially different in configuration from the main valve 91 is provided. The main valve 91F is provided with a disk 83F at a predetermined intermediate position in a stacking direction of the plurality of disks 83. A projection 256 that projects on one side in the axial direction is formed on the outer side of the disk 83F in the radial direction. The projection 256 projects toward the valve seat portion 48F. The projection 256 presses the outer peripheral side of one disk 83, which is closer to the valve seat portion 48F than the disk 83F, against the valve seat portion 48F. The main valve 91F is constantly in contact with the inner seat portion 47F and is separated from or seated on the valve seat portion 48F. The main valve 91F and the valve seat portion 48F constitute a first damping force generating mechanism 41F.

In the seventh embodiment, the passage between the main valve 71F and the valve seat portion 50F which appears when the valve is opened in the contraction stroke, the passage in the passage hole 39F, and the passage in the step portion 251 constitute a first passage 72F on a contraction side. The passage between the main valve 91F and the valve seat portion 48F which appears when the valve is opened in the extension stroke, the passage in the passage hole 37F, and the passage in the step portion 252 constitute a first passage 92F on an extension side.

Eighth Embodiment

Next, an eighth embodiment will be described mainly based on FIG. 14, focusing on portions different from the third embodiment. The portions common to the third embodiment are represented by the same terms and the same reference signs.

Figure 14:
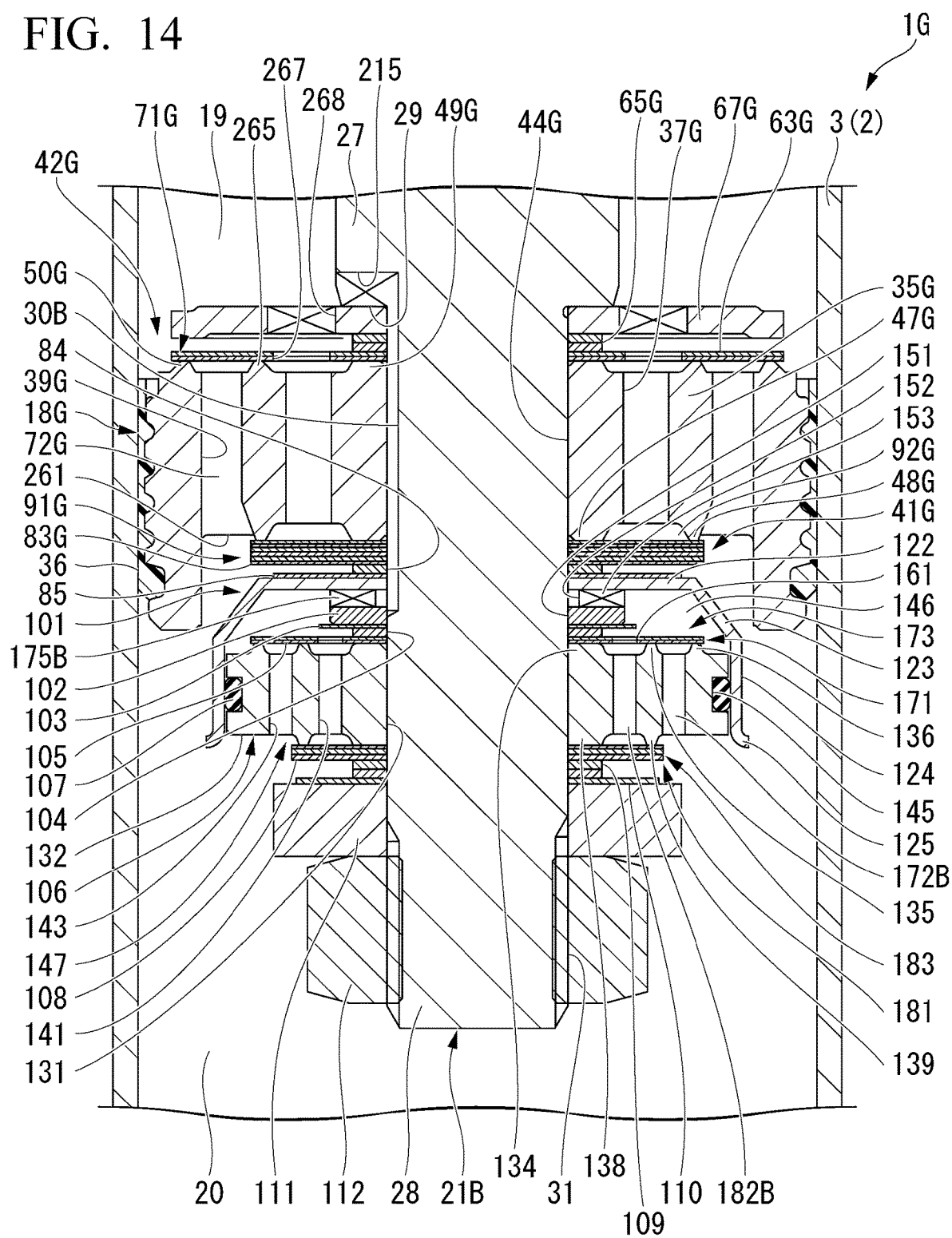
FIG. 14 is a cross-sectional view showing a main part of a shock absorber according to an eighth embodiment of the present invention.

As shown in FIG. 14, a shock absorber 1G of the eighth embodiment has a piston 18G which is partially different in configuration from the piston 18B of the third embodiment. In the piston 18G, a piston main body 35G is partially different in configuration from the piston main body 35B.

In the center of the piston main body 35G in the radial direction, an insertion hole 44G is formed to penetrate the piston main body 35G in the axial direction. The attachment shaft portion 28 of the piston rod 21B is fitted to the insertion hole 44G. The piston main body 35G is provided with a plurality of passage holes 37G through which the upper chamber 19 and the lower chamber 20 can communicate with each other and a plurality of passage holes 39G through which the upper chamber 19 and the lower chamber 20 can communicate with each other. The piston main body 35G is a sintered product. In the piston main body 35G, the passage holes 37G and 39G are formed at the time of sintering or by a cutting process with a drill.

The plurality of passage holes 37G extend parallel to the piston main body 35G in the axial direction. The plurality of passage holes 39G also extend parallel to the piston main body 35G in the axial direction. The plurality of passage holes 37G are formed on the inner side of the piston main body 35G in the radial direction with respect to the plurality of passage holes 39G.

A recess 261 is formed in the center in the radial direction at the end portion of the piston main body 35G on the lower chamber 20 side in the axial direction. The recess 261 is recessed toward the upper chamber 19 side in the axial direction. At the bottom position of the recess 261, on the inner side of the piston main body 35G in the radial direction with respect to an opening of the passage hole 37G on the lower chamber 20 side, an annular inner seat portion 47G is formed. At the bottom position of the recess 261, on the outer side of the piston main body 35G in the radial direction with respect to an opening of the passage hole 37G on the lower chamber 20 side and on the inner side of the piston main body 35G in the radial direction with respect to an opening of the passage hole 39G on the lower chamber 20 side, an annular valve seat portion 48G is formed.

In the end portion of the piston main body 35G on the upper chamber 19 side in the axial direction, on the inner side of the piston main body 35G in the radial direction with respect to an opening of the passage hole 37G on the upper chamber 19 side, an annular inner seat portion 49G is formed. In the end portion of the piston main body 35G on the upper chamber 19 side in the axial direction, on the outer side of the piston main body 35G in the radial direction with respect to an opening of the passage hole 37G on the upper chamber 19 side and on the inner side of the piston main body 35G in the radial direction with respect to an opening of the passage hole 39G on the upper chamber 19 side, an annular intermediate valve seat portion 265 is formed. In the end portion of the piston main body 35G on the upper chamber 19 side in the axial direction, on the outer side of the piston main body 35G in the radial direction with respect to an opening of the passage hole 39G on the upper chamber 19 side, an annular outer valve seat portion 50G is formed.

In the eighth embodiment, the main valve 71G on a contraction side is provided instead of the main valve 71. The main valve 71G is constituted by a plurality (specifically, two) of disks 63G. The main valve 71G is constantly in contact with the inner seat portion 49G and is in contact with the intermediate valve seat portion 265 and the outer valve seat portion 50G to be able to be separated from or seated on them. The main valve 71G opens and closes the passage in the passage hole 39G on a contraction side. The intermediate valve seat portion 265, the outer valve seat portion 50G, and the main valve 71G constitute a first damping force generating mechanism 42G on a contraction side.

On a side of the main valve 71G opposite to the piston 18G in the axial direction, a plurality (specifically, two) of disks 65G having an outer diameter smaller than the outer diameter of the main valve 71G are provided. An annular member 67G is provided on a side of the disks 65G opposite to the main valve 71G in the axial direction. The outer diameter of the annular member 67G is the same as the outer diameter of the main valve 71G, and the annular member 67G is in contact with the shaft step portion 29. The annular member 67G restricts the deformation of the main valve 71G in an opening direction beyond a specified value. In the disk 63G, at a position between the intermediate valve seat portion 265 and the inner seat portion 49G, a through hole 267 is formed. Also in the disk 65G, a through hole 268 at a position in the radial direction which is aligned with the through hole 267 is formed. These through holes 267 and 268 allow the passage in the passage hole 37G to constantly communicate with the upper chamber 19.

In the eighth embodiment, the main valve 91G on an extension side is provided instead of the main valve 91. The main valve 91G is constituted by a plurality (specifically, five) of disks 83G. The main valve 91G is constantly in contact with the inner seat portion 47G and is in contact with the valve seat portion 48G to be able to be separated from or seated on it. The main valve 91G opens and closes the passage in the passage hole 37G on an extension side. A side of the main valve 91G opposite to the piston 18G is in contact with the disk 84.

In the eighth embodiment, the passage between the main valve 71G and the outer valve seat portion 50G which appears when the valve is opened in the contraction stroke and the passage in the passage hole 39G constitute a first passage 72G on a contraction side. Further, the passage between the main valve 91G and the valve seat portion 48G which appears when the valve is opened in the extension stroke, the passage in the passage hole 37G, and the passages in the through holes 267 and 268 constitute a first passage 92G on an extension side.

The main valve 91G, the disk 84, the disk 85, and the bottom portion 122 and the intermediate tapered portion 123 of the cap member 101 are disposed to be in the recess 261 of the piston main body 35G of the piston 18G. As a result, the axial length of the entire components attached to the attachment shaft portion 28 of the piston rod 21B is shortened.

Ninth Embodiment

Next, a ninth embodiment will be described mainly based on FIG. 15, focusing on portions different from the third embodiment. The portions common to the third embodiment are represented by the same terms and the same reference signs.

Figure 15:
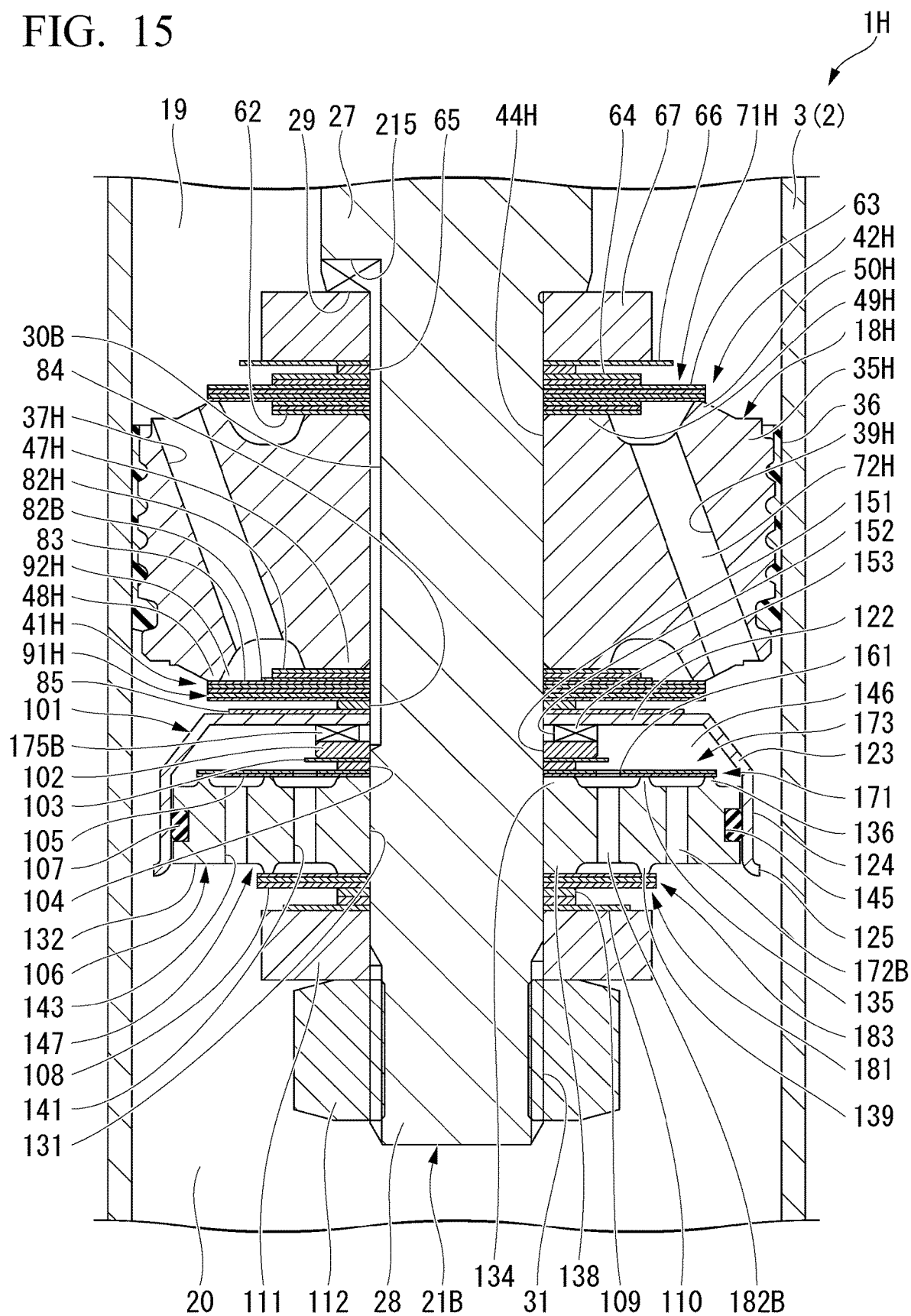
FIG. 15 is a cross-sectional view showing a main part of a shock absorber according to a ninth embodiment of the present invention.

As shown in FIG. 15, a shock absorber 1H of the ninth embodiment has a piston 18H which is partially different in configuration from the piston 18B of the third embodiment. In the piston 18H, a piston main body 35H is partially different in configuration from the piston main body 35B.

In the center of the piston main body 35H in the radial direction, an insertion hole 44H is formed to penetrate the piston main body 35G in the axial direction. The attachment shaft portion 28 of the piston rod 21 is fitted to the insertion hole 44H. The piston main body 35H is provided with a plurality of passage holes 37H (only one is shown in FIG. 15 due to the cross section) through which the upper chamber 19 and the lower chamber 20 can communicate with each other and a plurality of passage holes 39H (only one is shown in FIG. 15 due to the cross section) through which the upper chamber 19 and the lower chamber 20 can communicate with each other. In the piston main body 35H, the passage holes 37H and 39H are formed by a cutting process.

The plurality of passage holes 37H have a linear shape as a whole. The plurality of passage holes 37H are inclined with respect to the axial direction of the piston main body 35H. The plurality of passage holes 39H also have a linear shape as a whole. The plurality of passage holes 39H are also inclined with respect to the axial direction of the piston main body 35H. In the plurality of passage holes 37H, a side on the upper chamber 19 is located on the outer side of the piston main body 35H in the radial direction with respect to a side on the lower chamber 20. In the plurality of passage holes 39H, a side on the lower chamber 20 is located on the outer side of the piston main body 35H in the radial direction with respect to a side on the upper chamber 19. The piston main body 35H is formed in a shape of which the front and back sides are not distinguished from each other and becomes the same shape regardless of an orientation in which the piston main body 35H is attached to the piston rod 21 in the axial direction.

In the end portion of the piston main body 35H on the lower chamber 20 side in the axial direction, on the inner side of the piston main body 35H in the radial direction with respect to an opening of the passage hole 37H on the lower chamber 20 side, an annular inner seat portion 47H is formed. In the end portion of the piston main body 35H on the lower chamber 20 side in the axial direction, on the outer side of the piston main body 35H in the radial direction with respect to an opening of the passage hole 37H on the lower chamber 20 side, an annular valve seat portion 48H is formed. The inner seat portion 47H is recessed toward the inner side of the piston main body 35H in the axial direction with respect to the valve seat portion 48H.

In the end portion of the piston main body 35H on the upper chamber 19 side in the axial direction, on the inner side of the piston main body 35H in the radial direction with respect to an opening of the passage hole 39H on the upper chamber 19 side, an annular inner seat portion 49H is formed. In the end portion of the piston main body 35H on the upper chamber 19 side in the axial direction, on the outer side of the piston main body 35H in the radial direction with respect to an opening of the passage hole 39H on the upper chamber 19 side, an annular valve seat portion 50H is formed.

In the ninth embodiment, a first damping force generating mechanism 42H which is partially different in configuration from the first damping force generating mechanism 42 is provided. The first damping force generating mechanism 42H has a main valve 71H which is different from the main valve 71 in that a plurality (specifically, three) of disks 62 is provided.

In the ninth embodiment, a first damping force generating mechanism 41H which is partially different in configuration from the first damping force generating mechanism 41B is provided. The first damping force generating mechanism 41H has a main valve 91H. The main valve 91H is different from the main valve 91 in that a plurality (specifically, two) of disks 82H are provided on a side of the disk 82B opposite to the disk 83. A side of the disk 82H opposite to the disk 82B is in contact with the inner seat portion 47H. The outer diameter of the disk 82H is smaller than the outer diameter of the disk 82B.

In the ninth embodiment, the passage between the main valve 71H and the valve seat portion 50H which appears when the valve is opened in the contraction stroke and the passage in the passage hole 39H constitute a first passage 72H on a contraction side. Further, the passage between the main valve 91H and the valve seat portion 48H which appears when the valve is opened in the extension stroke and the passage in the passage hole 37H constitute a first passage 92H on an extension side.

In the seventh to ninth embodiments, changes to the third embodiment have been described as an example, but each of the structures of the seventh to ninth embodiments is applicable to the first, second, and fourth to sixth embodiments.

Further, the above embodiment shows an example in which the present invention is used for a double-cylinder type hydraulic shock absorber, but the present invention is not limited to this. The present invention may be used for mono-cylinder type hydraulic shock absorber in which a gas chamber is formed as a slidable compartment on a side of the lower chamber 20 in the cylinder 2 opposite to the upper chamber 19 without the outer cylinder, and it is possible to use the present invention for any shock absorber including a pressure control valve that uses a packing valve having a structure in which the disk is provided with a sealing member.

According to a first aspect of the embodiment described above, there is provided a shock absorber including a cylinder which is filled with a working fluid; a piston which is slidably provided in the cylinder and divides an inside of the cylinder into one side chamber and another side chamber; a piston rod which is connected to the piston and extends outside the cylinder; a first passage and a second passage through which the working fluid flows from a chamber on an upstream side to a chamber on a downstream side in the cylinder by a movement of the piston; a first damping force generating mechanism which is provided in the first passage provided in the piston and generates a damping force; and a second damping force generating mechanism which is provided in an annular valve seat member disposed in the other side chamber, is provided in the second passage which is parallel to the first passage, and generates a damping force. The second damping force generating mechanism includes a first sub valve provided on one side of the second passage provided in the valve seat member and a second sub valve provided on another side of the second passage, and a bottomed tubular cap member provided between the piston and the valve seat member in the second passage. The valve seat member is provided in the cap member. The first sub valve is provided in the other side chamber. The second sub valve is provided in a cap chamber between a bottom portion of the cap member and the valve seat member. In the second passage, an orifice is disposed on an upstream side or a downstream side from the first sub valve in flow by which the first sub valve is opened. In a region in which a piston speed is low, a valve of the second damping force generating mechanism is opened in a state in which a valve of the first damping force generating mechanism is closed, and in a speed region in which the piston speed is higher than that in the region in which the piston speed is low, the valve of the first damping force generating mechanism and the valve of the second damping force generating mechanism are both opened. Accordingly, it is possible to improve the durability of the valve.

According to a second aspect, in the first aspect, the second passage is not a constantly communicating passage.

According to a third aspect, in the first or second aspect, the piston rod is inserted into the piston, the cap member, and the valve seat member.

According to a fourth aspect, in any one of the first to third aspects, the orifice is formed by being cut out of a disk in the first damping force generating mechanism, the disc which is in contact with the piston.

According to fifth aspect, in any one of the first to fourth aspects, the second passage is formed by being cut out of the piston rod.

According to sixth aspect, in any one of the first to fifth aspects, the second sub valve which is an inflow valve into the cap chamber has a valve opening pressure lower than that of the first sub valve.

According to seventh aspect, in any one of the first to sixth aspects, a pressed part is used as the cap member.

INDUSTRIAL APPLICABILITY

According to the above-mentioned shock absorber, it is possible to improve the durability of the valve.

REFERENCE SIGNS LIST 1, 1A to 1H Shock absorber
2 Cylinder 18, 18B, 18F to 18H Piston
19 Upper chamber (i.e., one side chamber)
20 Lower chamber (i.e., another side chamber)
21, 21B Piston rod
41, 41B, 41F to 41H First damping force generating mechanism
42, 42B, 42F to 42H First damping force generating mechanism
72, 72F to 72H First passage
92, 92F to 92H First passage
101, 101C, 101E Cap member
106, 106C to 106E Valve seat member
122, 122C, 122E Bottom portion
146 Cap chamber
171, 171D Sub valve (i.e., second sub valve)
172, 172A to 172E Second passage
173, 173D Second damping force generating mechanism
175, 175B, 175D, 245 Orifice
181, 181E Sub valve (i.e., first sub valve)
182, 182A to 182E Second passage
183, 183E Second damping force generating mechanism

The invention claimed is:

1. A shock absorber comprising:
a cylinder which is filled with a working fluid;
a piston which is slidably provided in the cylinder and divides an inside of the cylinder into one side chamber and another side chamber;
a piston rod which is connected to the piston and extends outside the cylinder;
a first passage and a second passage through which the working fluid flows from a chamber on an upstream side to a chamber on a downstream side in the cylinder by a movement of the piston;
a first damping force generating mechanism which is provided in the first passage provided in the piston and generates a damping force; and
a second damping force generating mechanism which is provided in an annular valve seat member disposed in the other side chamber, is provided in the second passage which is parallel to the first passage, and generates a damping force,
wherein the second damping force generating mechanism includes
a first sub valve provided on one side of valve seat member including a passage hole which forms a part of the second passage, and a second sub valve provided on another side of the valve seat member, and
a bottomed tubular cap member provided between the piston and the valve seat member in the second passage,
the valve seat member is provided in the cap member, the first sub valve is provided in the other side chamber, and the second sub valve is provided in a cap chamber between a bottom portion of the cap member and the valve seat member,
in the second passage, an orifice is disposed on an upstream side or a downstream side from the first sub valve in flow by which the first sub valve is opened,
in a region in which a piston speed is low, a valve of the second damping force generating mechanism is opened in a state in which a valve of the first damping force generating mechanism is closed, and
in a speed region in which the piston speed is higher than that in the region in which the piston speed is low, the valve of the first damping force generating mechanism and the valve of the second damping force generating mechanism are both opened.

2. The shock absorber according to claim 1, wherein the second passage is not a constantly communicating passage.

3. The shock absorber according to claim 1, wherein the piston rod is inserted into the piston, the cap member, and the valve seat member.

4. The shock absorber according to claim 1, wherein the orifice is formed by being cut out of a disk in the first damping force generating mechanism, the disc which is in contact with the piston.

5. The shock absorber according to claim 1, wherein the second passage is formed by being cut out of the piston rod.

6. The shock absorber according to claim 1, wherein the second sub valve which is an inflow valve into the cap chamber has a valve opening pressure lower than that of the first sub valve.

7. The shock absorber according to, claim 1 wherein a pressed part is used as the cap member.

* * * * *